United States Patent [19]
Kimura et al.

[11] Patent Number: 5,793,543
[45] Date of Patent: Aug. 11, 1998

[54] MIRROR ANGLE ADJUSTING DEVICE FOR AUTOMOTIVE REARVIEW MIRROR ASSEMBLY

[75] Inventors: Sakae Kimura; Michio Hamada, both of Saitama, Japan

[73] Assignee: Kabushiki Kaisha Matsuyama Seisakusho, Japan

[21] Appl. No.: 476,055

[22] Filed: Jun. 7, 1995

Related U.S. Application Data

[63] Continuation of Ser. No. 92,899, Jul. 19, 1993, which is a continuation-in-part of Ser. No. 893,881, Jun. 4, 1992, Pat. No. 5,383,057.

[30] Foreign Application Priority Data

| Jul. 17, 1992 | [JP] | Japan | 4-056393 |
| Dec. 7, 1992 | [JP] | Japan | 4-090116 |
| Dec. 15, 1992 | [JP] | Japan | 4-091203 |
| Dec. 25, 1992 | [JP] | Japan | 4-092929 |
| Feb. 3, 1993 | [JP] | Japan | 5-039447 |

[51] Int. Cl.$^6$ .................................... B60R 1/06
[52] U.S. Cl. .................. 359/875; 359/872; 359/882; 248/479
[58] Field of Search .................. 359/875, 872, 359/882, 841, 873, 874, 876; 362/135, 139, 419, 422, 425, 427, 66; 248/479

[56] References Cited

U.S. PATENT DOCUMENTS

| 4,660,944 | 4/1987 | Suzuki et al. ............... 359/872 |
| 4,856,886 | 8/1989 | Polzer et al. ............... 359/875 |
| 4,913,543 | 4/1990 | Haba et al. ............... 359/875 |
| 4,941,639 | 7/1990 | Sakao ............... 359/875 |
| 5,177,642 | 1/1993 | Wakimoto ............... 359/844 |
| 5,182,676 | 1/1993 | Iwai et al. ............... 359/875 |

FOREIGN PATENT DOCUMENTS

| 61-122047 | 6/1986 | Japan | B60R 1/06 |
| 62-134346 | 6/1987 | Japan | B60R 1/06 |
| 63-53141 | 3/1988 | Japan | B60R 1/06 |
| 2-53652 | 2/1990 | Japan | B60R 1/06 |

*Primary Examiner*—Paul M. Dzierzynski
*Assistant Examiner*—John Juba, Jr.
*Attorney, Agent, or Firm*—Howard L. Rose

[57] ABSTRACT

A mirror angle adjusting device for use with an automotive rearview mirror assembly has a base member adapted to be fixed to an automobile body, a mirror housing assembly angularly movably coupled to the base member, a mirror holder tiltably supported on the mirror housing assembly and holding a rearview mirror, a control lever assembly for remotely controlling angular adjustment of the rearview mirror, and a coupling assembly for coupling the mirror holder and the control lever assembly. The coupling assembly includes a rotatable shaft mechanism having at least one shaft rotatable about an axis thereof in response to operation of the control lever assembly, an arm swingable about the shaft in response to rotation of the shaft for tilting the mirror holder, and a clutch assembly for selectively disconnecting the control lever assembly from the mirror holder, the clutch assembly including a cam on the shaft and a flat spring assembly between the arm and the shaft for resiliently engaging the cam.

17 Claims, 31 Drawing Sheets

MIRROR ANGLE ADJUSTING DEVICE FOR AUTOMOTIVE REARVIEW MIRROR ASSEMBLY

This is a continuation of co-pending application Ser. No. 08/092,899, filed on Jul. 19, 1993 which is a continuation-in-part of application Ser. No. 07/893,881 filed Jun. 4, 1992, now U.S. Pat. No. 5,383,057.

BACKGROUND OF THE INVENTION

1. Field of the Invention

The present invention relates to a device for adjusting the mirror angle of an automotive rearview mirror assembly, particularly a tiltable rearview mirror assembly for use on an automobile.

2. Description of the Prior Art

Some rearview mirror assemblies on automobiles have a control lever in the passenger compartment for adjusting the angle of a rearview mirror such as a door-mounted rearview mirror that is located outside of the passenger compartment.

Such a rearview mirror assembly comprises a mirror holder pivotally supported by a bracket fixedly mounted in a mirror housing. The mirror holder which supports a rearview mirror is coupled to the control lever through a connecting member. Controlling movement such as tilting movement or rotation of the control lever is transmitted through the connecting member to the mirror holder for thereby moving the mirror holder to adjust the angle of the rearview mirror.

When the mirror housing is forcibly tilted backwards, for example, under external forces applied, the applied external forces are transmitted through the bracket and the connecting member to the control lever. Therefore, the control lever starts moving as the mirror housing is tilted. Since the control lever is usually movable within a limited angular range, if the control lever is stopped in a certain limit position of the angular range, then any additional forces applied to tilt the mirror housing are imposed on the stopped control lever, and thereafter the mirror housing is prevented from being tilted sufficiently.

Japanese laid-open patent publication No. 2-53652, for example, discloses a rearview mirror assembly including a clutch disposed in a connecting member interconnecting a mirror holder and a control lever. When forces greater than a certain level are applied to the rearview mirror, the clutch is disengaged to cut off the transmission of forces between the control lever and the mirror holder.

More specifically, the clutch comprises a shaft disposed in the connecting member and rotatable by the control lever and an arm engaging the shaft. Under normal conditions, the arm remains in engagement with the shaft by a coil spring disposed in the arm. Upon application of excessive forces, the arm is angularly moved out of engagement with the shaft against the resiliency of the coil spring, thus cutting off the transmission of the forces.

However, since the coil spring is housed in the arm, the arm has a considerable vertical thickness commensurate with the diameter of the coil spring. Therefore, the arm is relatively large in size, posing limitations on the space available for installing the arm.

SUMMARY OF THE INVENTION

It is therefore an object of the present invention to provide a mirror angle adjusting device for automotive rearview mirror assemblies which has a relatively small clutch for cutting off the transmission of forces between a mirror holder and a control lever when forces beyond a certain level are applied, and yet allows smooth mirror angle adjustments.

According to the present invention, there is provided a mirror angle adjusting device for use with an automotive rearview mirror assembly, comprising a base member adapted to be fixed to an automobile body, a mirror housing assembly angularly movably coupled to the base member, a mirror holder tiltably supported on the mirror housing assembly and holding a rearview mirror, control lever means for remotely controlling angular adjustment of the rearview mirror, and coupling means for coupling the mirror holder and the control lever means, the coupling means comprising a rotatable shaft mechanism having at least one shaft rotatable about an axis thereof in response to operation of the control lever means, an arm swingable about the shaft in response to rotation of the shaft for tilting the mirror holder, and clutch means for selectively disconnecting the control lever means from the mirror holder, the clutch means comprising a cam on the shaft and flat spring means between the arm and the shaft for resiliently engaging the cam.

The arm may have a flat base having a hole through which the shaft is rotatably inserted, the shaft having at least one flat engaging surface as the cam on an outer circumference thereof, the flat spring means comprising at least one rod-shaped spring extending on the flat base in a longitudinal direction thereof and engaging the flat base in resilient engagement with the engaging surface.

The mirror housing assembly may comprise a bracket coupled to a back of the mirror holder through a pivot member so that the mirror holder is tiltably supported on the bracket, the bracket being angularly movably held in engagement with an upstanding fixed shaft on the base member, and a mirror housing integrally coupled to the bracket, the bracket and the base member having respective surfaces abutting against each other and having convex and concave members, respectively, which are engageable with each other.

The mirror angle adjusting device may further comprise resilient means for resiliently allowing the bracket to move away from the base member to cause the convex and concave members to disengage from each other when the mirror housing is turned by an external force to change an angular position thereof with respect to the base member, and for biasing the convex and concave members to engage each other again after the mirror housing is released from the external force.

The arm may have a distal end pivotally coupled to the back of the mirror holder and having an arcuate slot extending in a predetermined angular range about the shaft, the bracket having an upstanding tapered engaging pin extending substantially parallel to the shaft and slidably engaging in the arcuate slot, the arrangement being such that when the mirror housing is turned by the external force to change the angular position thereof with respect to the base member, the tapered engaging pin engages a peripheral edge of the arcuate slot to secure the bracket and the arm to each other upon movement of the bracket away from the base member to cause the convex and concave members to disengage from each other.

The arm may support on the distal end thereof a slider having a ball-shaped pivot member and a spherical recess receiving the ball-shaped pivot member, the mirror holder having a space defined therein, and wherein the slider is slidably disposed in the space in order to absorb a displacement of the arm with respect to the mirror holder when the mirror holder is tilted in response to swinging movement of the arm.

The control lever means may comprise a cylindrical member rotatably disposed on the base member; and a control lever operatively coupled to the cylindrical member, the coupling means comprises first link means for operatively coupling the shaft to the cylindrical member to rotate the shaft in response to operation of the control lever to rotate the cylindrical member.

The rotatable shaft mechanism may comprise a tubular shaft as the at least one shaft, and a rod shaft disposed coaxially in the tubular shaft and rotatable independently of the tubular shaft, the control lever having a cylindrical end rotatably fitted in a cylindrical hole extending perpendicularly to an axis of the cylindrical member, the coupling means comprising second link means for operatively coupling the control lever to the rod shaft to rotate the rod shaft in response to rotation of the control lever.

Alternatively, the rotatable shaft mechanism may comprise a tubular shaft as the at least one shaft, and a rod shaft disposed coaxially in the tubular shaft and rotatable independently of the tubular shaft, the control lever being swingably supported on a support shaft extending perpendicularly to an axis of the cylindrical member, the coupling means comprising second link means for operatively coupling the control lever to the rod shaft to rotate the rod shaft in response to rotation of the control lever.

The above and further objects, details and advantages of the present invention will become apparent from the following detailed description of preferred embodiments thereof, when read in conjunction with the accompanying drawings.

DETAILED DESCRIPTION OF THE PREFERRED EMBODIMENTS

Figure 1:
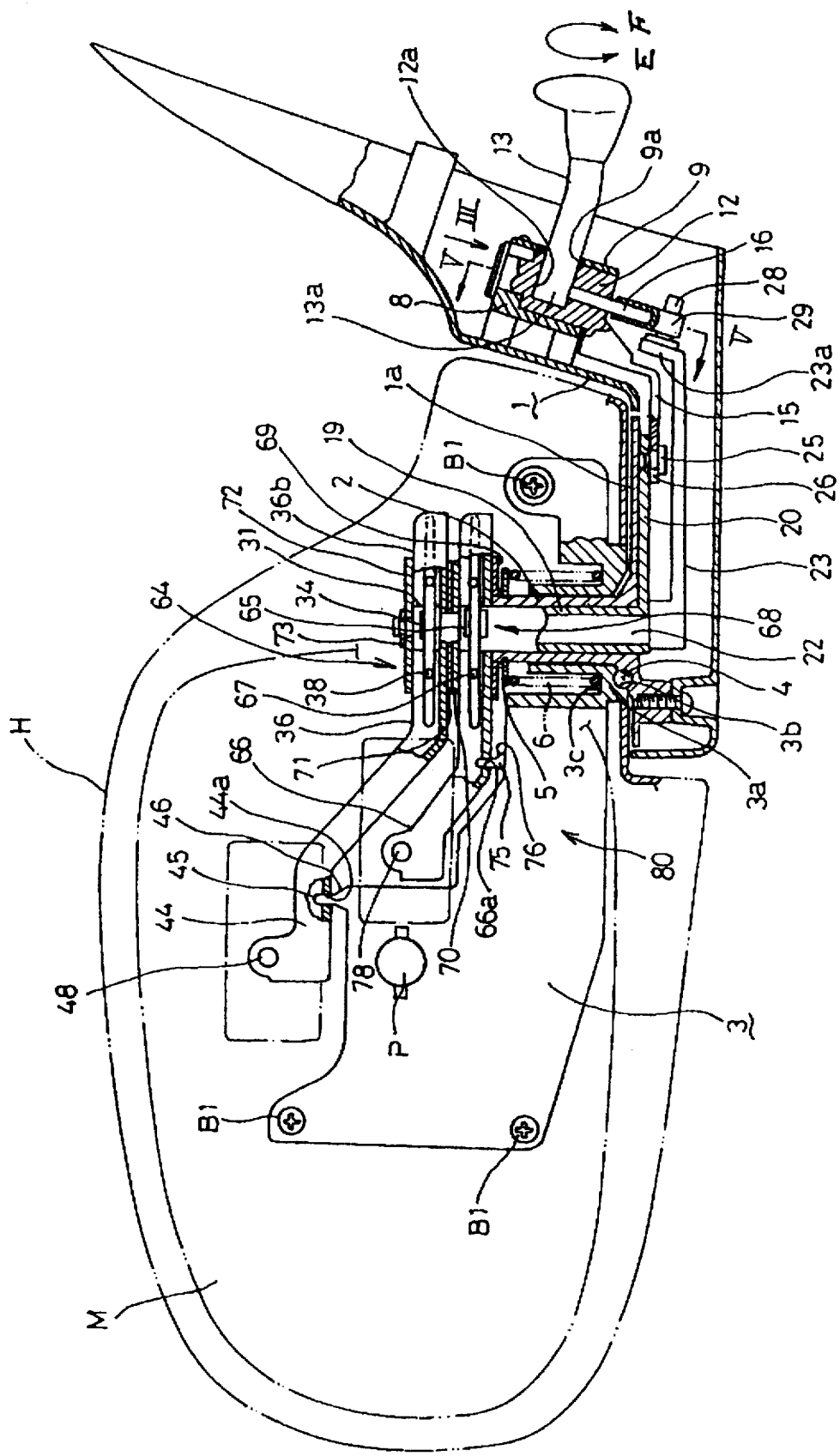
FIG. 1 is a fragmentary sectional front elevational view of an automotive rearview mirror assembly which incorporates a mirror angle adjusting device according to a first embodiment of the present invention.
Figure 2:
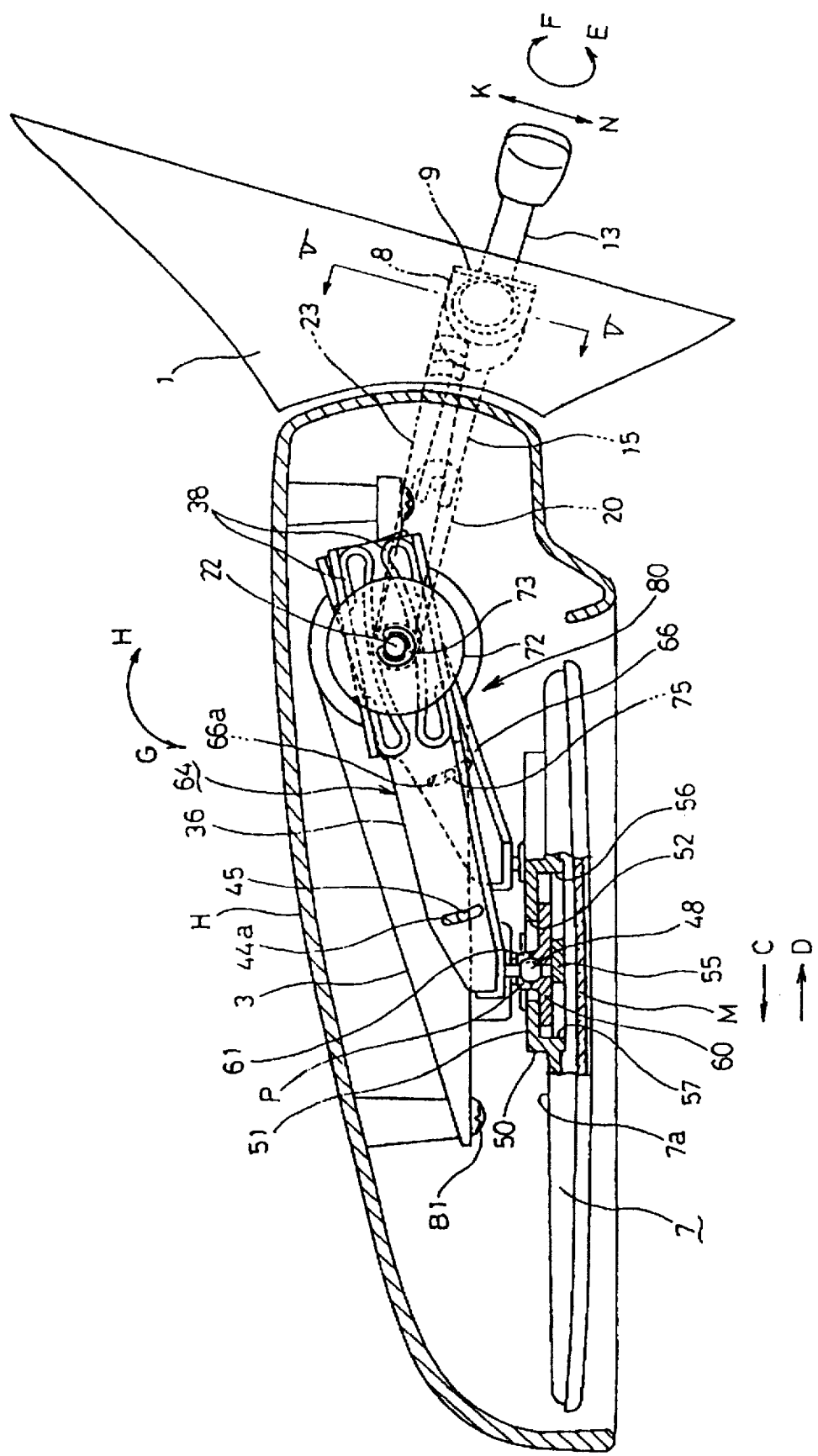
FIG. 2 is a horizontal cross-sectional view of the automotive rearview mirror assembly shown in FIG. 1.

As shown in FIGS. 1 and 2, a mirror angle adjusting device according to a first embodiment of the present invention is preferably incorporated in an automotive rearview mirror assembly, particularly, a tiltable automotive rearview mirror assembly.

The tiltable automotive rearview mirror assembly comprises a base member 1 fixedly supported on an automobile body, a bracket 3 angularly movably supported on the base member 1, a mirror holder 7 tiltably supported on the bracket 3 by a pivot P and holding a rearview mirror M, and a mirror housing H integrally coupled to the bracket 3 thus providing a mirror housing assembly. The base member 1 has a central step 1a including an integral cylindrical fixed shaft or sleeve shaft 2 which extends vertically. The bracket 3 has a base portion 3a rotatably disposed around the fixed shaft 2. The bracket 3 is fastened to the mirror housing H by screws B1.

A circular array of balls (convex members) 4 are partly embedded in an upper surface of the central step 1a and have portions projecting upwardly from the upper surface of the central step 1a. The projecting portions of the balls 4 engage in respective holes (concave members) 3b defined in a lower surface of the base portion 3a of the bracket 3 for positioning the bracket 3, i.e., the mirror housing H, with respect to the base member 1.

The base portion 3a of the bracket 3 has a circular groove 3c defined therein which receives a coil spring 6 having an upper end acting on a retaining ring 5 that is fixed to an upper portion of the shaft 2. The bracket 3 is normally urged downwardly toward the base member 1 under the bias of the coil spring 6 for thereby holding the balls 4 in the respective holes 3b.

The pivot P is disposed on a front surface of the bracket 3, and the mirror holder 7 that holds the mirror M is tiltably supported by the pivot P.

Figure 3:
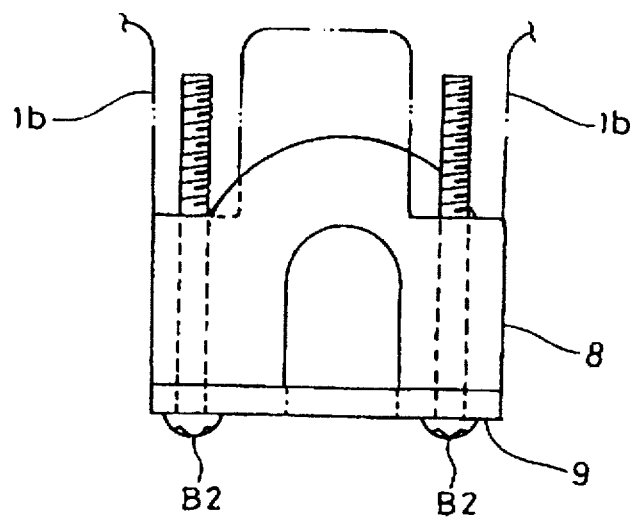
FIG. 3 is an enlarged view as viewed in the direction indicated by the arrow III in FIG. 1.
Figure 4:
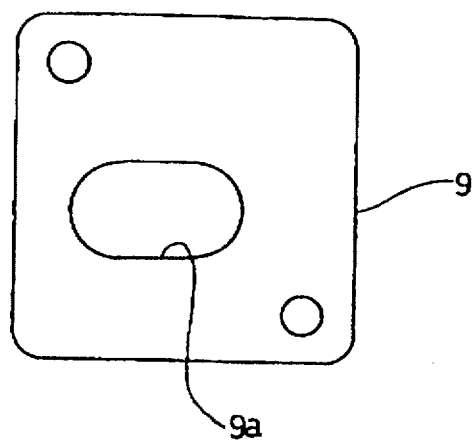
FIG. 4 is a front elevational view of a presser plate.

A support member 8 is mounted in the base member 1 near the automobile body. As shown in FIG. 3, the support member 8 is of a substantially U shape with a presser plate 9 attached to a front surface thereof. As shown in FIG. 4, the presser plate 9 is of a substantially square shape and has an oblong hole 9a defined therein which extends horizontally. The support member 8 and the presser plate 9 are fastened to attachment legs 1b projecting from the base member 1 by screws B2 as shown in FIG. 3.

As shown in FIG. 1, a cylindrical member 12 is rotatably disposed in the support member 8, with an arm 15 being integral with the cylindrical member 12. The cylindrical member 12 has a cylindrical hole 12a defined therein which extends perpendicularly to the axis of the cylindrical member 12. In the cylindrical hole 12a, there is rotatably fitted a cylindrical end portion 13a of a control lever 13 which extends through the oblong hole 9a in the presser plate 9. The control lever 13, which serves to adjust the angle of the rearview mirror M, has a knob end projecting into the passenger compartment of the automobile body.

Figure 5:
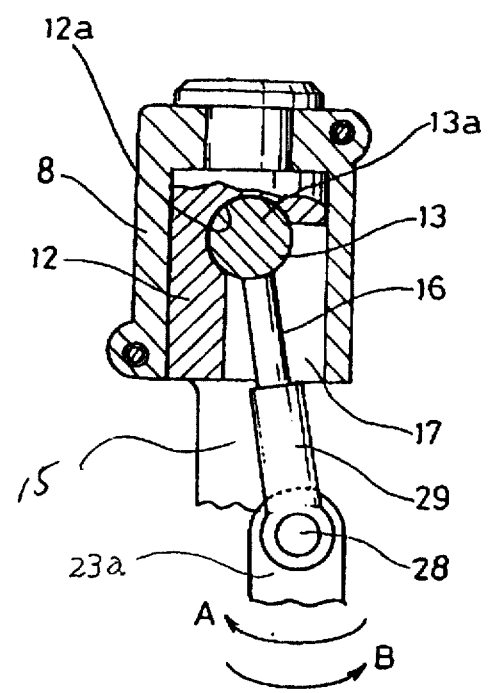
FIG. 5 is a cross-sectional view taken along line V—V of FIG. 1.

As shown in FIGS. 1 and 5, a swing rod 16 has an upper end fixed radially to the cylindrical end portion 13a of the control lever 13. As shown in FIG. 5, the swing rod 16 is swingable in the directions indicated by the arrows A, B about the control lever 13 within an angular range that is defined by a space 17 defined in the cylindrical member 12.

As shown in FIG. 1, a vertical tubular shaft 19 is rotatably disposed in the fixed shaft 2, and a horizontal arm 20 is integrally joined to the lower end of the tubular shaft 19. A smaller-diameter rod shaft 22 is rotatably disposed in the tubular shaft 19, and a horizontal arm 23 is integrally joined to the lower end of the rod shaft 22.

Figure 6:
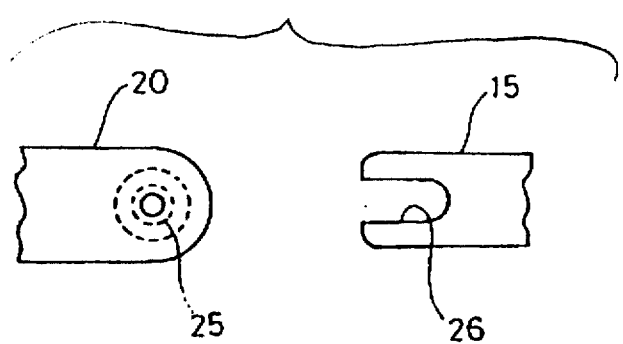
FIG. 6 is a plan view showing the manner in which arms engage each other.

A downwardly extending engaging pin 25 is fixed to the distal end of the arm 20, and engages in a recess 26 (see FIG. 6) defined in the distal end or the arm 15 that is connected to the control lever 13. The arm 23 has a raised distal end 23a with an integral support shaft 28 on which a tubular member 29 is swingably supported. The swing rod 16 is slidably fitted in the tubular member 29.

As described later on, the arms 15, 20 jointly serve as a first link means for operatively connecting the tubular shaft 19 to the cylindrical member 12 so that the tubular shaft 19 can be rotated in response to swinging movement of the control lever 13 about the cylindrical member 12. The swing rod 16, the tubular member 29, and the arm 23 jointly serve as a second link means for operatively connecting the rod shaft 22 to the control lever 13 so that the rod shaft 22 can be rotated in response to rotation of the control lever 13 about its own axis.

Figure 7:
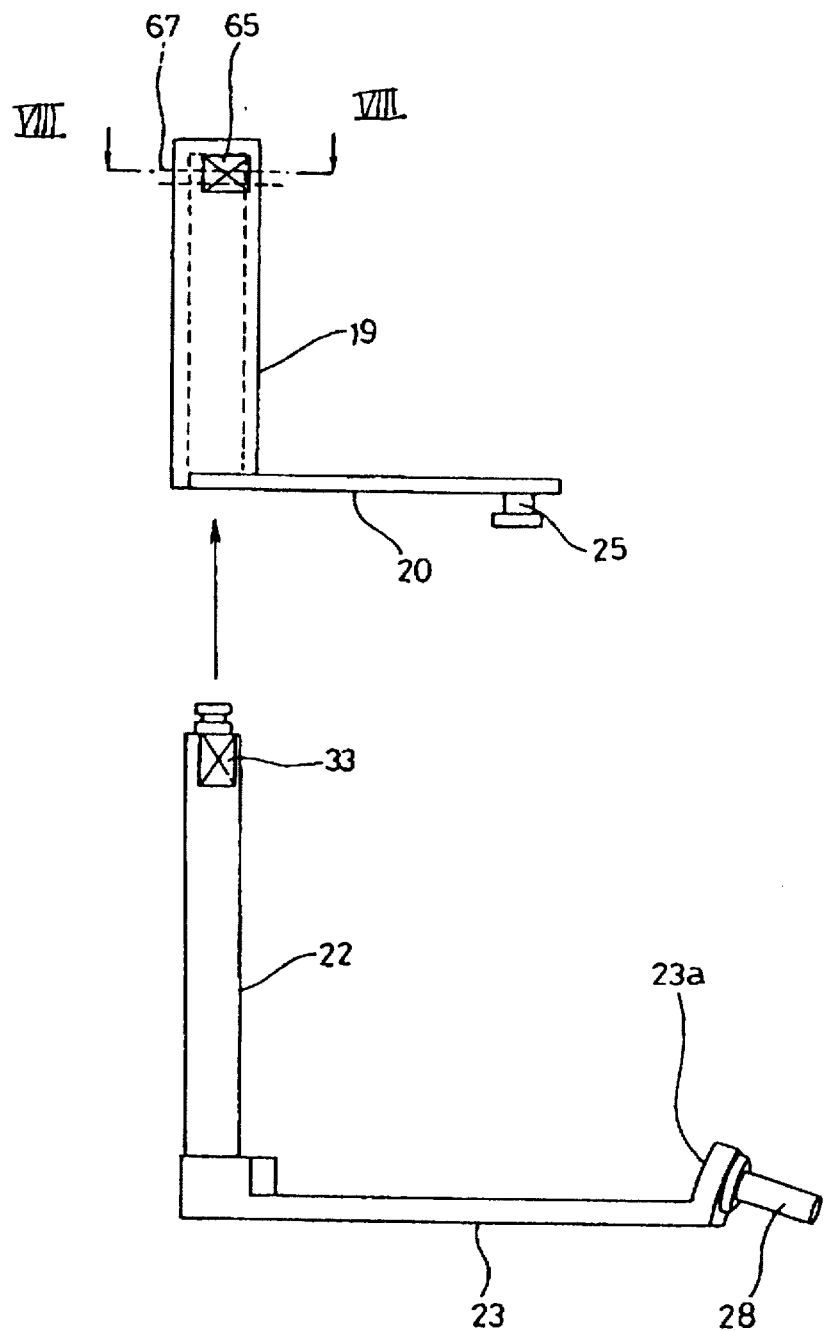
FIG. 7 is an exploded view of the manner in which a tubular shaft and a rod shaft are assembled.
Figure 9:
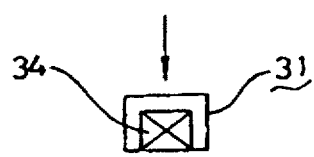
FIG. 9 is a side elevational view of a collar.
Figure 10:
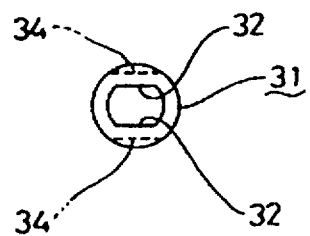
FIG. 10 is a view of the collar as viewed in the direction indicated by the arrow X in FIG. 9.

A collar 31 is fitted over the upper end of the rod shaft 22. As shown in FIGS. 9 and 10, the collar 31 has a pair of diametrically opposite flat engaging surfaces 32 on its inner circumference and a pair of diametrically opposite flat engaging surfaces or cam surfaces 34 on its lower outer circumference. As shown in FIG. 7, the rod shaft 22 has a pair of diametrically opposite flat engaging surfaces 33 on the outer circumference of its upper end. When the collar 31 is fitted over the rod shaft 22, the engaging surfaces 32 of the collar 31 engage the respective engaging surfaces 33 of the rod shaft 22, thus making the collar 31 nonrotatable with respect to the rod shaft 22, i.e., making the collar 31 rotatable in unison with the rod shaft 22.

Figure 11:
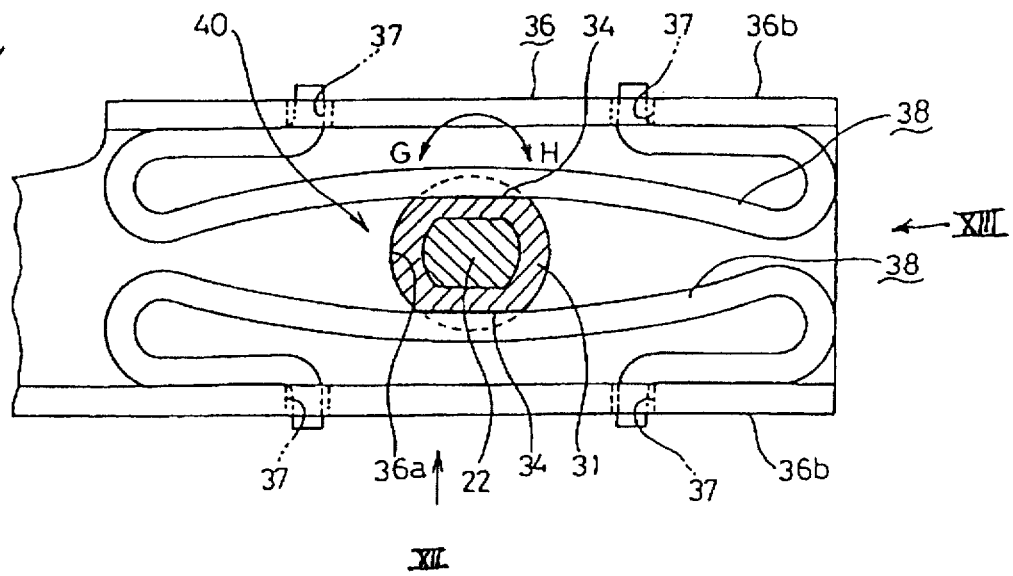
FIG. 11 is a fragmentary plan view of an arm for adjusting a vertical mirror angle, the arm supporting springs.
Figure 13:
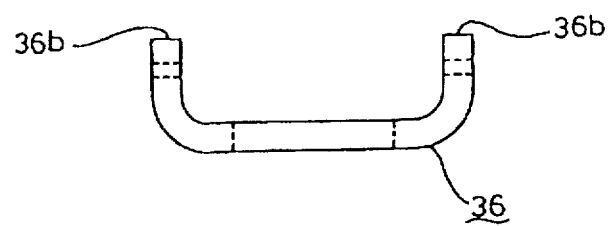
FIG. 13 is a view of the arm as viewed in the direction indicated by the arrow XIII in FIG. 12.

As shown in FIGS. 1 and 2, an arm 36 is rotatably disposed around the collar 31. As shown in FIGS. 11 and 13, the arm 36 comprises a base in the form of a substantially flat plate which extends in the axial direction of the automobile body, and which has a through hole 36a defined centrally therein. The collar 31 is inserted in the through hole 36a. The base of the arm 36 has a pair of upstanding flanges 36b on opposite sides thereof each having a pair of spaced engaging holes 37 defined therein. Two flat rod-shaped springs 38 are disposed on the base between the flanges 36b. Each of the springs 38 has opposite ends inserted in the respective engaging holes 37 in one of the flanges 37b, so that the springs 38 are fixed to the arm 36. The springs 38 are elongate in the longitudinal direction of the arm 36.

The springs 38 have central regions extending substantially parallel to each other and engaging the engaging surfaces 34 of the collar 31 thereby gripping the engaging surfaces 34. The engaging surfaces 34 and the springs 38 jointly serve as a first clutch 40. The central region of the springs 38 are straight in their free state. However, when they engage the engaging surfaces 34, they are curved, producing resilient forces, as shown in FIG. 11. Since the springs 38 are held in engagement with the engaging surfaces 34 under constant resiliency, the collar 31 is held in engagement with the springs 38, allowing rotation of the rod shaft 22 to be transmitted to the arm 36 through the springs 38. In this condition, the clutch 40 is engaged.

Figure 12:
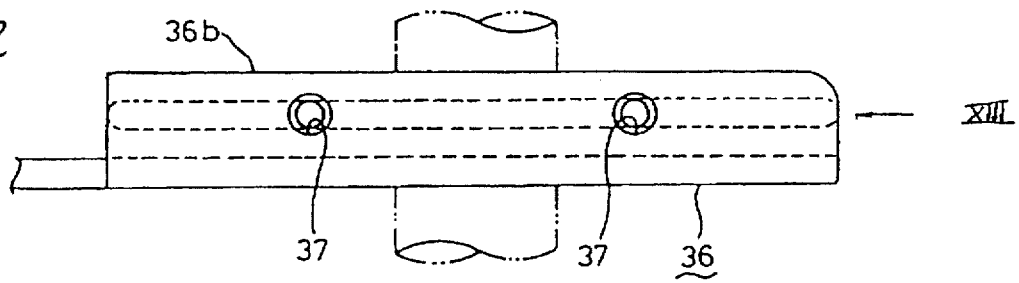
FIG. 12 is a view of the arm as viewed in the direction indicated by the arrow XII in FIG. 11.
Figure 14:
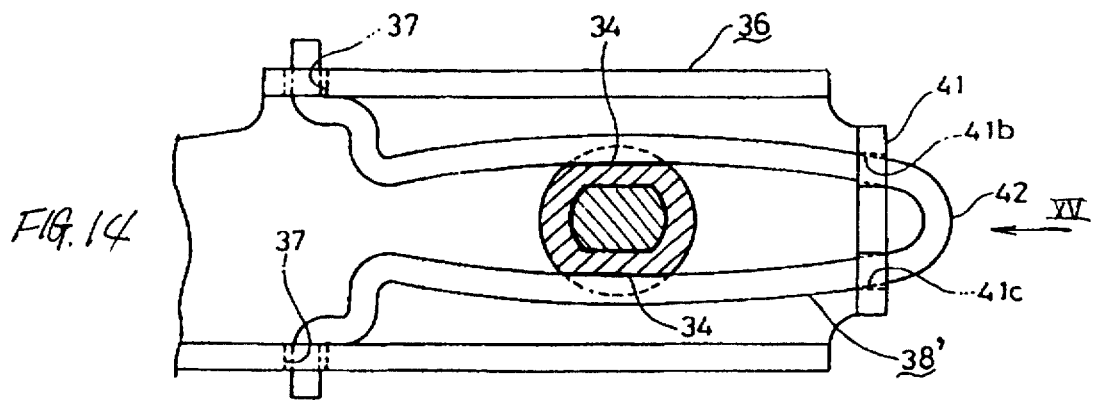
FIG. 14 is a fragmentary plan view of a modified arm for adjusting a vertical mirror angle, the arm supporting springs.
Figure 15:
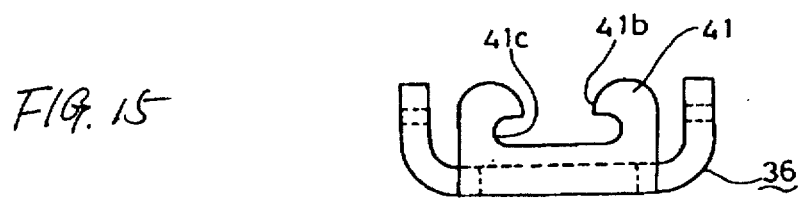
FIG. 15 is a view of the arm as viewed in the direction indicated by the arrow XV in FIG. 14.

FIGS. 14 and 15 show a modification of the arm 36 and the springs 38. In this modification, an upstanding flange 41 is disposed on an end of an arm 36 and has an insertion hole 41b and an wider engaging hole 41c which are defined therein. A flat rod-shaped spring 38', which is of a substantially U shape, has a curved end 42 inserted into the engaging hole 41c through the insertion hole 41b. The end 42 of the spring 38' is resiliently spread and retained in the engaging hole 41c. The spring 38' has respective opposite ends engaging in engaging holes 37 defined in opposite side flanges of the arm 36. The other details of the arm 36 and the springs 38 are the same as those of the arrangement shown in FIGS. 11 through 13.

Figure 16:
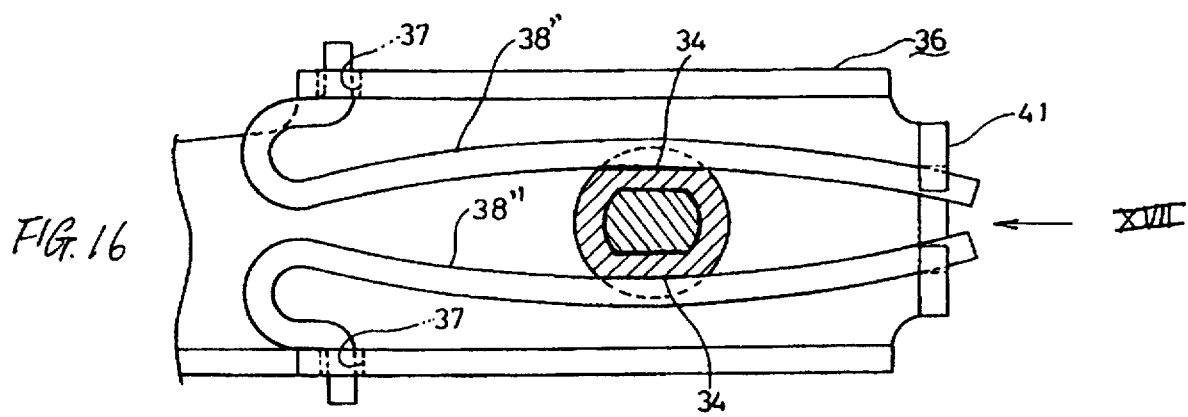
FIG. 16 is a fragmentary plan view of another modified arm for adjusting a vertical mirror angle, the arm supporting springs.
Figure 17:
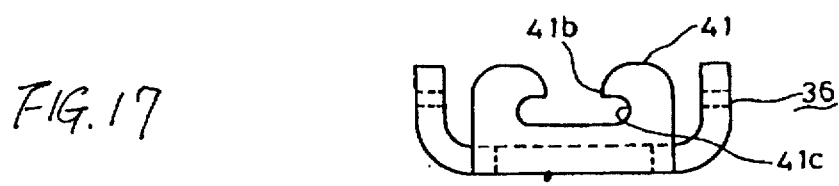
FIG. 17 is a view of the arm as viewed in the direction indicated by the arrow XVII in FIG. 16.

FIGS. 16 and 17 show another modification of the arm 36 and the springs 38. In FIGS. 16 and 17, two flat rod-shaped springs 38" have respective opposite ends engaging in engaging holes 37 defined in opposite side flanges of the arm 36. The other details of the arm 36 and the springs 38" are the same as those of the arrangement shown in FIGS. 14 and 15.

Figure 22:
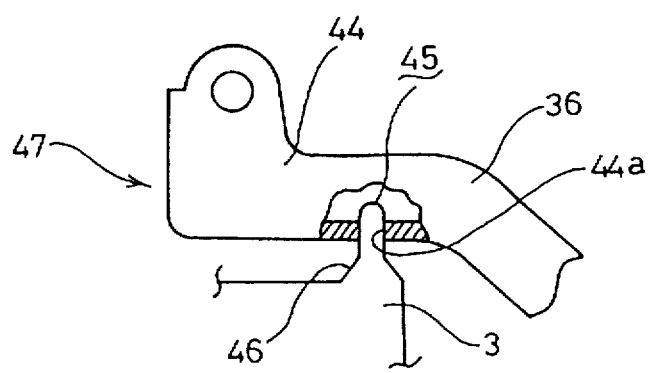
FIG. 22 is an enlarged cross-sectional view of a lock mechanism on a vertical angle adjusting arm of the automotive rearview mirror assembly.

As shown in FIG. 1, the arm 36 has an outer portion, remote from the automobile body, extending obliquely upwardly and has a horizontal portion 44 leading to the outer end thereof. As shown in FIG. 2, the horizontal portion 44 has an arcuate slot 44a defined therein in a certain angular range about the rod shaft 22 for allowing the arm 36 to rotate about the rod shaft 22 to adjust the angle of the rearview mirror M. An engaging pin 45 which projects from an upper surface of the bracket 3 substantially parallel to the rod shaft 22 slidably engages in the slot 44a. As shown in FIG. 1, more specifically in FIG. 22, the engaging pin 45 has a tapered portion 46 whose diameter is progressively greater downwardly. When the bracket 3 is moved upwardly, the tapered portion 46 engages a peripheral edge of the slot 44a, pushing the horizontal portion 44 upwardly for thereby locking the bracket 3 with respect to the arm 36. The tapered portion 46 and the slot 44a jointly serve as a first lock mechanism 47.

Figure 18:
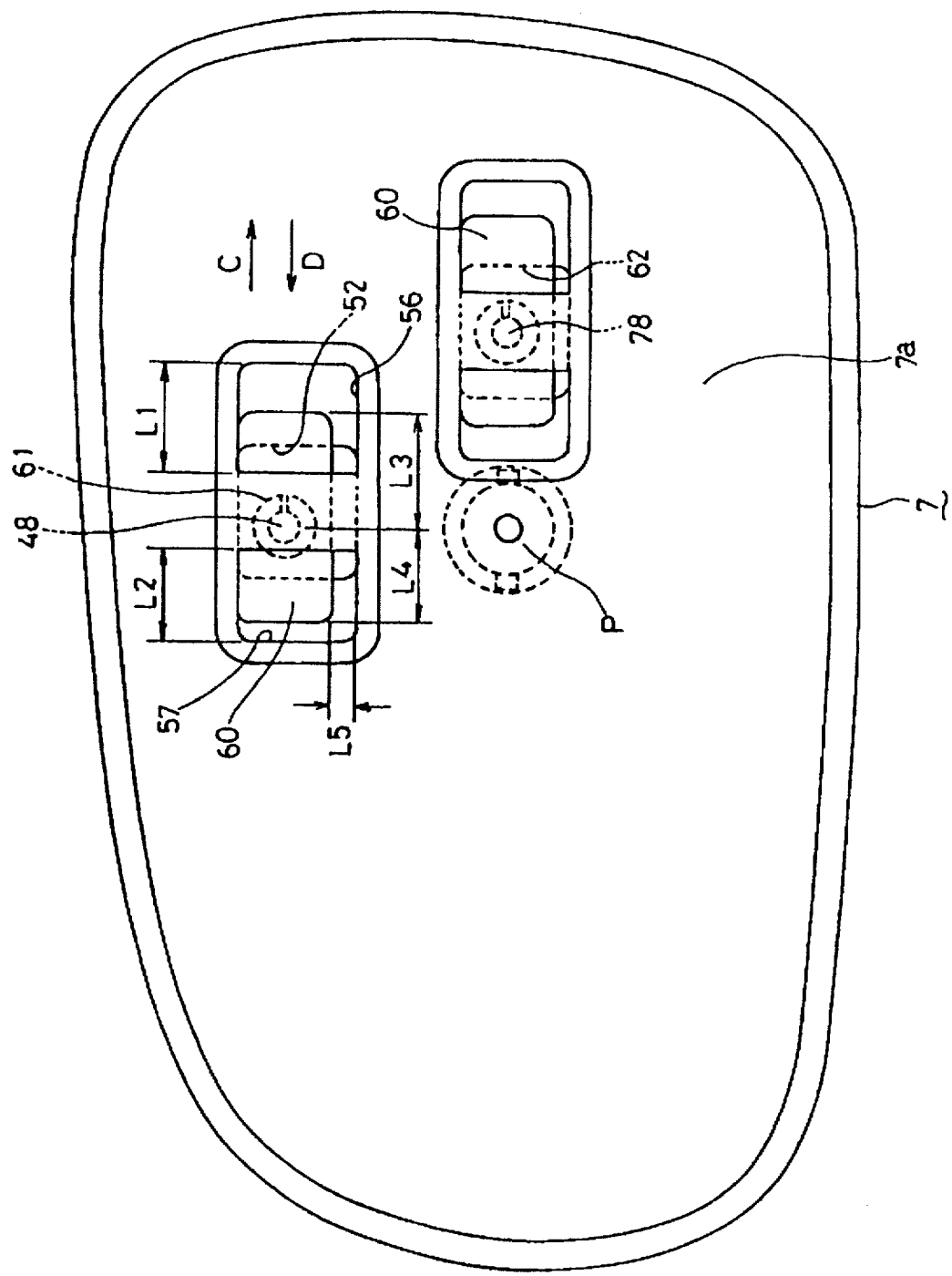
FIG. 18 is a front elevational view of a mirror holder.

A ball-shaped pivot member 48 is disposed on the distal end of the arm 36 and pivotally supported on the mirror holder 7 as follows:

As shown in FIGS. 2 and 18, the mirror holder 7 has a step 50 on its main region 7a which has a substantially rectangular opening 52 defined in its wall 51. The opening 52 is defined not horizontally centrally in the wall 51, but in a position displaced slightly outwardly from the automobile body.

As shown in FIG. 2, the mirror holder 7 has a support plate 55 integral with the main region 7a within the step 50 and spaced from the wall 51. The mirror holder 7 also has a pair of windows 56, 57 defined between the support plate 55 and ends of the step 50. The windows 56, 57 have respective widths L1, L2 (see FIG. 18), the width L1 being greater than the width L2.

The support plate 55 and the wall 51 jointly define a space between which accommodates a slider 60 that is slidably therein. The slider 60 is slidable in the directions indicated by the arrows C, D. The slider 60 has on its back a support portion 61 having a spherical recess, and the ball-shaped pivot member 48 is pivotally fitted in the spherical recess of the support portion 61. The distance L3 from the support portion 61 to the right end of the slider 60 is longer than the distance L4 from the support portion 61 to the left end of the slider 60. The distance L4 is greater than the distance that can be traversed by the ball-shaped pivot member 48, as described later on. The lower end of the slider 60 is spaced from the lower edges of the windows 56, 57 by a distance L5, which is large enough to allow the mirror holder 7 to move upwardly with the bracket 3 when the bracket 3 is turned with respect to the base member 1 forcibly lifting the holes 3b upwardly from the balls 4. Therefore, the distance L corresponds to the distance by which the balls 4 project upwardly from the central step 1a.

To assemble the slider 60 in the step 50, the slider 60 is inclined and its right end is inserted into the opening 52 until it reaches the window 56 thereby to insert the pivot member 48 into the opening 52. Thereafter, the left end of the slider 60 is put in the opening 52, and the slider 60 is swung into parallel to the mirror holder 7. The slider 60 is then moved to the left until it is positioned behind the wall 51 of the step 50. The interval by which the distance L4 overlaps the left-hand side portion of the wall 51 is selected to be larger than the distance that can be traversed by the ball-shaped pivot member 48. Thereafter, after the slider 60 is assembled, the slider 60 is prevented from being dislodged from the opening 52.

As shown in FIG. 18, an opening 62 is defined in the mirror holder 7 in right-angularly spaced relationship to the opening 52 with respect to the pivot P. A structure around the opening 62 is the same as the structure around the opening 52. Another slider 60 is thus assembled in the opening 62 in the same manner as with the opening 52. The slider 60 in the opening 62 is pivotally supported on a pivot member 78 of an arm 66 (described later).

The slider 60 in the step 50 is coupled to the ball-shaped pivot member 48 on the arm 36 by holding the slider 60 in a preset position and pressing the slider 60 against the ball-shaped pivot member 48. At this time, forces are applied to the arm 36. Since the edge of the arcuate slot 44a is engaged by the engaging pin 45, however, the arm 36 can be moved only to an end of the arcuate slot 44a, thus holding the ball-shaped pivot member 48 against movement. Therefore, the slider 60 can easily be coupled to the ball-shaped pivot member 48.

The arm 23, the shaft 22, the clutch 40, and the arm 36 jointly serve as a first coupling means 64 for coupling the control lever 13 and the mirror holder 7 to each other.

Figure 8:
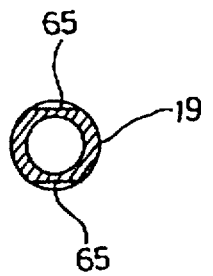
FIG. 8 is a cross-sectional view taken along line VIII—VIII of FIG. 7.

As shown in FIGS. 7 and 8, the tubular shaft 19 has a pair of flat engaging surfaces or cam surfaces 65 on its upper outer circumference. An arm 66 is rotatably disposed around the tubular shaft 19. The arm 66, which is structurally similar to the arm 36, supports a pair flat rod-shaped springs 67 between its opposite side flanges. The springs 67 are held in engagement with the engaging surfaces 65 of the tubular shaft 19. The engaging surfaces 65 and the springs 67 jointly serve as a second clutch 68. The second clutch 48 is essentially identical in structure to the first clutch 40 except that the collar 31 is replaced with the shaft 19 and the springs 38 with the springs 67.

In FIG. 1, the arm 66 is supported on a bearing 69. A washer 70 and a friction-reduction plate 71 are disposed between the arms 36, 66. A holder 72 is placed on the arm 36. The holder 72, the arm 36, the washer 70, the friction-reduction plate 71, and the arm 66 are held down below an upper limit position which is defined by a retainer 73 which engages in an engaging groove defined in the upper end of the rod shaft 22.

Figure 23:
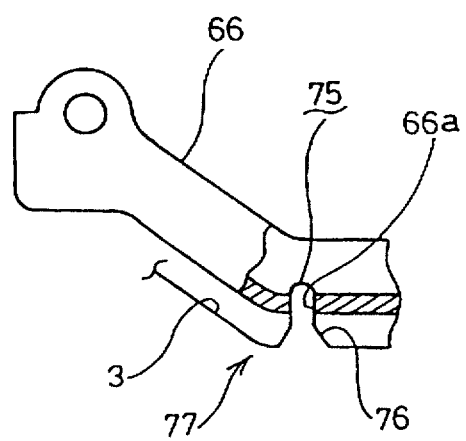
FIG. 23 is an enlarged cross-sectional view of a lock mechanism on a horizontal angle adjusting arm of the automotive rearview mirror assembly.

As shown in FIG. 2, the arm 66 has, in its portion remote from the automobile body, an arcuate slot 66a defined therein in a certain angular range about the rod shaft 22 for allowing the arm 66 to rotate about the rod shaft 22 to adjust the angle of the rearview mirror M. An engaging pin 75 which projects from an upper surface of the bracket 3 substantially parallel to the rod shaft 22 slidably engages in the slot 66a. The slot 66a and the engaging pin 75 are related to each other in the same manner as the slot 46a and the engaging pin 45. As shown in FIG. 1, more specifically in FIG. 23, the engaging pin 75 has a tapered portion 76 whose diameter is progressively greater downwardly. When the bracket 3 is moved upwardly, the tapered portion 76 engages a peripheral edge of the slot 66a, pushing the arm 66 upwardly for thereby locking the bracket 3 with respect to the arm 66. The tapered portion 76 and the slot 66a jointly serve as a second lock mechanism 77.

The arm 66 is inclined obliquely upwardly away from the automobile body and has a ball-shaped pivot member 78 on its upper end. The ball-shaped pivot member 78 is pivotally coupled to the slider 60 in the opening 62 in the mirror holder 7.

The arms 12, 20, the tubular shaft 20, the clutch 68, and the arm 66 jointly serve as a second coupling means 80 for coupling the control lever 13 and the mirror holder 7 to each other.

A process of operating the mirror angle adjusting device of the above structure to adjust the angle of the rearview mirror M will be described below.

When the control lever 13 is turned about its own axis in the direction indicated by the arrow E or F in FIGS. 1 and 2, the swing rod 16 swings in the longitudinal direction of the automobile body, i.e., in a direction normal to the sheets of FIGS. 1 and 2, or the direction indicated by the arrow A or B in FIG. 5. The swinging movement of the swing rod 16 is transmitted through the tubular member 29 to the arm 23, which is now swung about the rod shaft 22 in the longitudinal direction of the automobile body. The rod shaft 22 is angularly moved about its own axis, and so is the collar 31 with the rod shaft 22.

When the collar 31 is angularly moved about its own axis in the direction indicated by the arrow G or H in FIG. 11, since the springs 38 resiliently engage the engaging surfaces 34, the arm 36 is turned about the rod shaft 22 in the direction indicated by the arrow G or H in FIG. 2 through the springs 38. The rotation of the arm 36 causes the pivot member 48 to push or pull the mirror holder 7 in the longitudinal direction of the automobile body. The mirror holder 7 is now tilted vertically about the pivot P, thus adjusting the vertical angle of the rearview mirror M.

At this time, the arm 36 is turned about the rod shaft 22, causing the pivot member 48 to make an arcuate movement. When viewed in plan, the relative position of pivot member 48 with respect to the mirror holder 7 varies horizontally in the direction indicated by the arrow C or D in FIG. 18. The positional displacement of the arm 36 with respect to the mirror holder 7 when the mirror M is tilted by the arm 36 is absorbed as the slider 60 slides in the direction indicated by the arrow C or D with respect to the mirror holder 7.

When the control lever 13 is swung in a plane along the oblong hole 9a in the longitudinal direction of the automobile body, the cylindrical member 12 is turned about its own axis, and the arm 15 swings about the cylindrical member 12 in the longitudinal direction of the automobile body. The swinging movement of the arm 15 causes the arm 20 to swing about the tubular shaft 19 in the longitudinal direction of the automobile body, whereupon the tubular shaft 19 turns about its own axis. Since the springs 67 resiliently engage the engaging surfaces 65 of the tubular shaft 19, the arm 66 is turned about the tubular shaft 19 in the direction indicated by the arrow G or H in FIG. 2. The rotation of the arm 66 causes the pivot member 78 to push or pull the mirror holder 7 in the longitudinal direction of the automobile body. The mirror holder 7 is now tilted horizontally about the pivot P, thus adjusting the horizontal angle of the rearview mirror M.

At this time, the arm 66 is turned about the tubular shaft 19, causing the pivot member 78 to make an arcuate movement. Thus, the relative position of pivot member 78 with respect to the mirror holder 7 varies horizontally in the direction indicated by the arrow C or D in FIG. 18. The positional displacement of the arm 66 with respect to the mirror holder 7 when the mirror M is tilted by the arm 66 is absorbed as the slider 60 slides in the direction indicated by the arrow C or D with respect to the mirror holder 7.

It is assumed that a large force is applied to the mirror housing H from the front side of the automobile body, tilting the mirror housing H in the rearward direction of the automobile body. Since the bracket 3 is fixed to the mirror housing H, the applied force is transmitted to the bracket 3, moving the bracket 3. The holes 3b are lifted upwardly from the balls 4, and the bracket 3 is turned rearwardly with the mirror housing H about the fixed shaft 2. When the bracket 3 is turned in the rearward direction of the automobile body, the mirror holder 7 which is pivotally supported on the bracket 3 is also moved with the bracket 3. Since the pivot members 48, 78 are pivotally coupled to the mirror holder 7, the arms 36, 38 are turned in the rearward direction of the automobile body, i.e., in the direction G in FIG. 2, about the shafts 22, 19. Upon rotation of the arm 36, inasmuch as the clutch 40 is engaged, the rod shaft 22 is angularly moved in the direction G in FIG. 11 under a force which is applied in a direction opposite to the normal direction, and the control lever 13 is turned in the direction indicated by the arrow E through the arm 23, the tubular member 29, and the swing rod 16.

When the arm 66 is turned in the direction G, the tubular shaft 19 is turned also in the direction G, causing the arms 20, 15 to turn the cylindrical member 12. The control lever 13 is now swung in the direction N.

The angular movement and swinging movement of the control lever 13 are limited to predetermined ranges. More specifically, the control lever 13 is angularly movable as much as the swing rod 16 is swingable in the range defined by the space 17 shown in FIG. 5, and swingable as much as it is swingable in the oblong hole 9a. Therefore, as the arms 36, 66 are turned in the rearward direction of the automobile body, the control lever 13 reaches a limit position in its angular range, and is stopped. Upon continued angular movement of the arms 36, 66 in the direction G, the clutches 40, 68 are disengaged, preventing the forces from the arms 36, 66 from being transmitted to the control lever 13. At this time, the forces required to disengage the clutches 40, 68 are applied to the arms 36, 66. However, since these forces are borne by the arcuate hole 44a and the engaging pin 45, no large forces are applied to the mirror holder 7 and the slider 60.

More specifically, as shown in FIG. 11, insofar as the control lever 13 is movable, the clutch 40 remains engaged, and the rotation of the arm 36 is transmitted through the springs 38 and the collar 31 to the rod shaft 22, which is turned in the direction G. When the control lever 13 reaches its limit position and is stopped, the rod shaft 22 is also stopped. Further angular movement of the arm 36 forces the springs 38 to turn with respect to the rod shaft 22 which is kept at rest. The springs 38 are disengaged from the engaging surfaces 34, i.e., the clutch 40 is disengaged. The springs 38 are turned around the collar 31, so that the forces from the arm 36 are prevented from being applied to the control lever 13.

The clutch 68 operates in the same manner as the clutch 40. That is, the clutch 68 is disengaged when the springs 68 are disengaged from the engaging surfaces 65 of the tubular shaft 19, and the forces from the arm 66 are prevented from being applied to the control lever 13.

When an external force is applied to forcibly tilt the mirror housing H, the bracket 3 is lifted upwardly from the base member 1 and turned to, bringing the holes 3b out of engagement with the balls 4. The bracket 3 is lifted an interval corresponding to the interval by which the balls 4 project upwardly from the base member 1. Upon ascent of the bracket 3, the tapered portions 46, 76 of the engaging pins 45, 75 on the bracket 3 engage the peripheral edges of the slots 44a, 66a in the arms 36, 66, thus securing the arms 36, 66 with respect to the bracket 3. The vertical and horizontal angles of the mirror holder 7 are now fixed. Even when the mirror housing H is tilted in the rearward direction of the automobile body or tilted back to its normal position, the mirror holder 7 is held in its vertical and horizontal angles. Heretofore, when the mirror housing H is tilted under an external force and then tilted back to its normal position, it has been necessary to adjust the angles of the mirror holder 7 back to the normal angles. According to the present invention, however, it is not necessary to adjust he angles of the mirror holder 7 because the position of the mirror holder 7 with respect to the mirror housing H is memorized by the engaging pins 45, 75 and the slots 44a, 66a.

Even if the control lever 13 is shifted from its original position, the control lever 13 can be returned to its original position under the spring forces of the clutches 40, 68 when the mirror housing H returns to its normal position. While conventional memory mechanisms are composed of a large number of parts and cannot efficiently assembled, the memory mechanism according to the present invention is relatively simple in structure and can easily be assembled.

In this embodiment, the clutches 40, 68 are composed of the engaging surfaces 34, 65 and the springs 38, 67, and the springs 38, 67 extend in the longitudinal direction of the arms 36, 66. Therefore, the vertical dimension or thickness of the clutches 40, 68 is smaller than conventional structures which employ coil springs, and the clutches 40, 68 can be installed in greater freedom.

The mirror angle adjusting device according to the above embodiment offers the following advantages:

(a) The cylindrical member 12 is disposed in the support member 8, and the end 13a of the control lever 13 is rotatably supported in the cylindrical hole 12a in the cylindrical member 12. The swing rod 16 coupled to the control lever 13 is swingable in the space 17. The control lever 13 is allowed to swing in the longitudinal direction of the automobile body when the cylindrical member 12 is rotated by the support member 8. The control lever 13 is allowed to turn about its own axis when the control lever 13 is angularly moved in the cylindrical hole 12a and the swing rod 16 swings in the space 17. This structure is easier to manufacture than a conventional structure in which a ball is mounted on an end of a control lever and rotatably fitted in a spherical recess defined in a base member, thereby pivotally supporting the control lever. More specifically, while the conventional structure employs the ball and the spherical recess that cannot easily be manufactured to a nicety, the structure according to the present invention employs the support member 8, the cylindrical member 12, and the cylindrical hole 12a which are relatively easy to be manufactured with dimensional accuracy. The control lever 13 is prevented from being worn and loosened for a long period of time as the load to operate the control lever 13 suffers no changes.

(b) The positional displacement caused by the arcuate movement of the pivot members 48, 78 upon angular movement of the arms 36, 66 is absorbed by the sliders 60. This allows only one pivot P to be used, making the entire structure simpler and easier to manufacture than a conventional arrangement in which the mirror holder is supported by two pivot members to absorb any positional displacement.

(c) When the mirror housing H is forcibly tilted by an external force, the tapered portions 46, 76 of the engaging pins 45, 76 engage the edges of the slots 44a, 66a, thus memorizing the angles of the mirror holder 7 with respect to the mirror housing H. Even when the mirror housing H is returned from its tilted position, therefore, the vertical and horizontal angles of the mirror holder 7 are held in their desired set angles.

Figure 19:
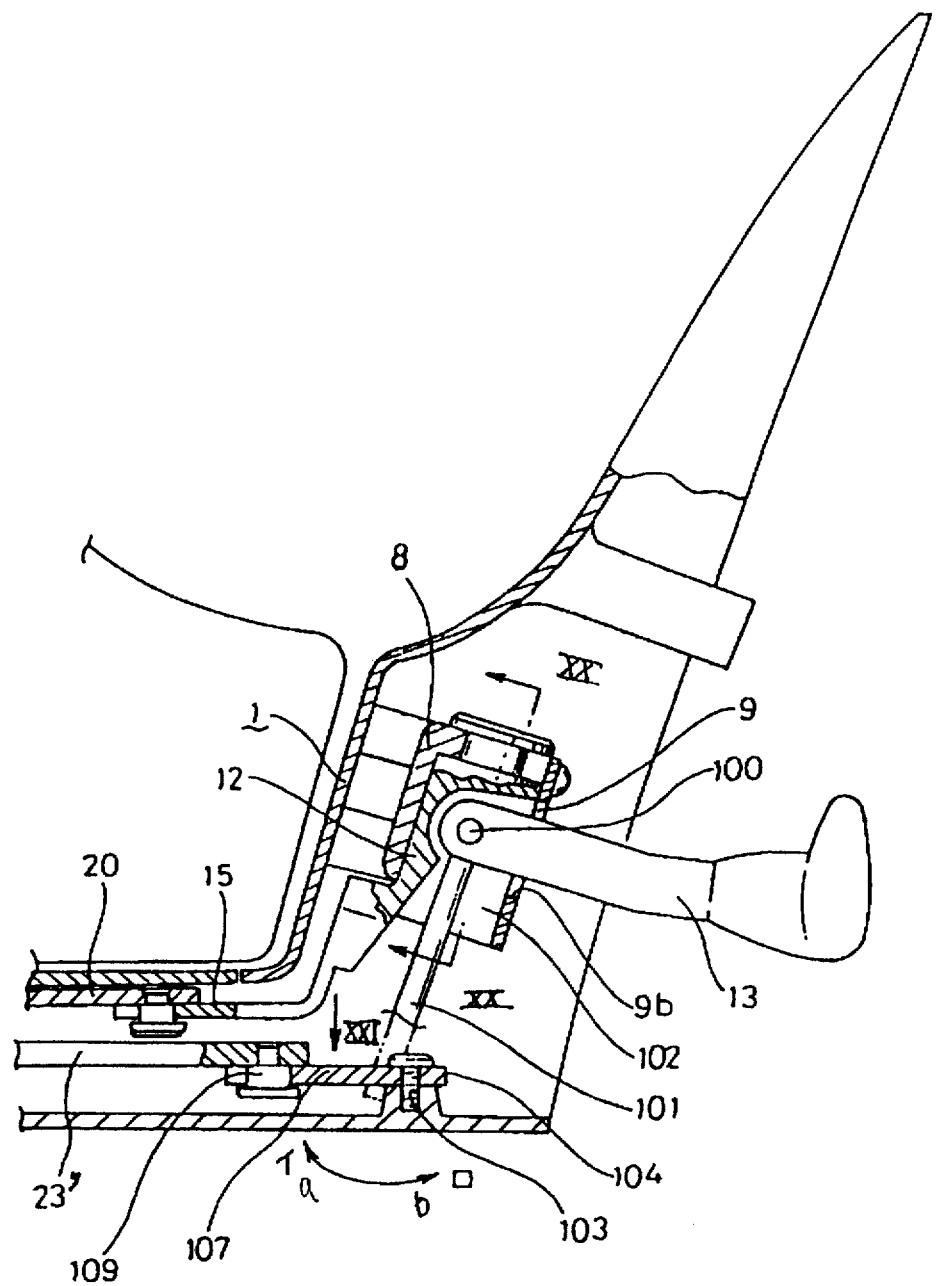
FIG. 19 is a fragmentary vertical cross-sectional view of an automotive rearview mirror assembly having a mirror angle adjusting device with a modified control lever.
Figure 20:
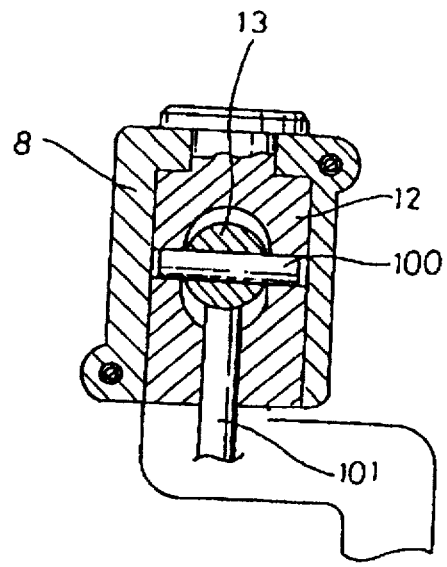
FIG. 20 is a cross-sectional view taken along line XX—XX of FIG. 19.
Figure 21:
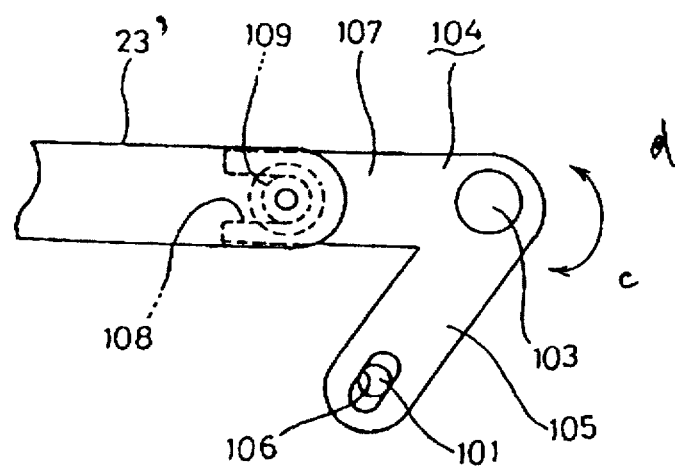
FIG. 21 is a view of a bell crank as viewed in the direction indicated by the arrow XXI in FIG. 19.

FIGS. 19 through 21 show an automotive rearview mirror assembly having a mirror angle adjusting device with a modified control lever. According to this modification, a control lever 13 is vertically swingably supported on a cylindrical member 12 in a support member 8 through a cylindrical shaft 100, and an upper end of a swing rod 101 is fixed to an end of the control lever 13. The swing rod 101 is swingable in transverse directions of the automobile body, i.e., in the directions indicated by the arrow a, b in FIG. 19, in a space 102 defined in the cylindrical member 12. The control lever 13 extends through a hole 9b that is defined vertically in a presser plate 9 fastened to the support member 8.

A bell crank 104 shown in FIG. 21 is centrally pivotally supported on a base member 1 by a support shaft 103. The bell crank 104 includes a lever 105 having a slot 106 defined in an end thereof in which a lower end of the swing rod 101 engages. The bell crank 104 also includes another lever 107 having a recess 108 in which there engages a pin 109 mounted on the lower surface of an end of an arm 23' that is partly different from the arm 23. The other details of the automotive rearview mirror assembly are identical to those of the automotive rearview mirror assembly according to the first embodiment.

According to the modification, the swing rod 101, the bell crank 104, and the arm 23' jointly serve as a second link means for operatively connecting the rod shaft 22 to the control lever 13 so that the rod shaft 22 can be rotated in response to vertical swinging movement of the control lever 13.

When the control lever 13 is vertically swung, the swing rod 101 swings in the direction a or b, causing the bell crank 104 to swing in the direction indicated by the arrow c or d in FIG. 21 about the support shaft 103, thus swinging the arm 23'. The arm 36 is thus swung to tilt the mirror holder 7 to adjust the vertical angle of the rearview mirror M.

Since the vertical angle of the rearview mirror M is adjusted by vertical swinging movement of the control lever 13 and the horizontal angle of the rearview mirror M is adjusted by horizontal swinging movement of the control lever 13, the control lever 13 is moved in different patterns from those for the control lever 13 in the first embodiment. Accordingly, the mirror angle adjusting device according to the first embodiment or the above modification may be selected depending on the type of automobiles in which it is to be incorporated.

A mirror angle adjusting device according to a second embodiment of the present invention will be described in detail below. Those parts of the mirror angle adjusting device according to the second embodiment which correspond to those of the first embodiment are denoted by corresponding reference numerals, and will not be described in detail.

Figure 24:
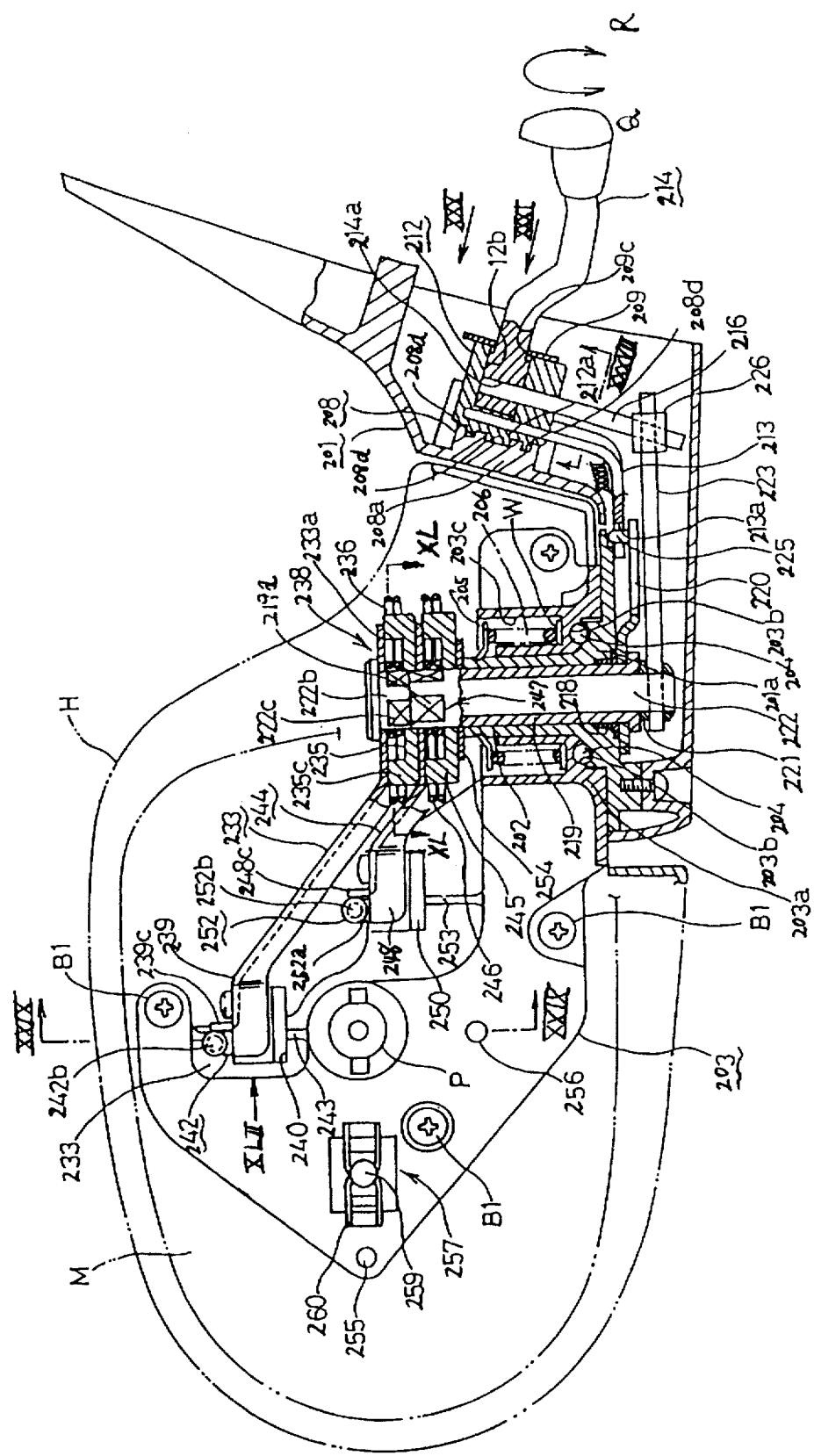
FIG. 24 is a fragmentary sectional front elevational view of an automotive rearview mirror assembly which incorporates a mirror angle adjusting device according to a second embodiment of the present invention.
Figure 26:
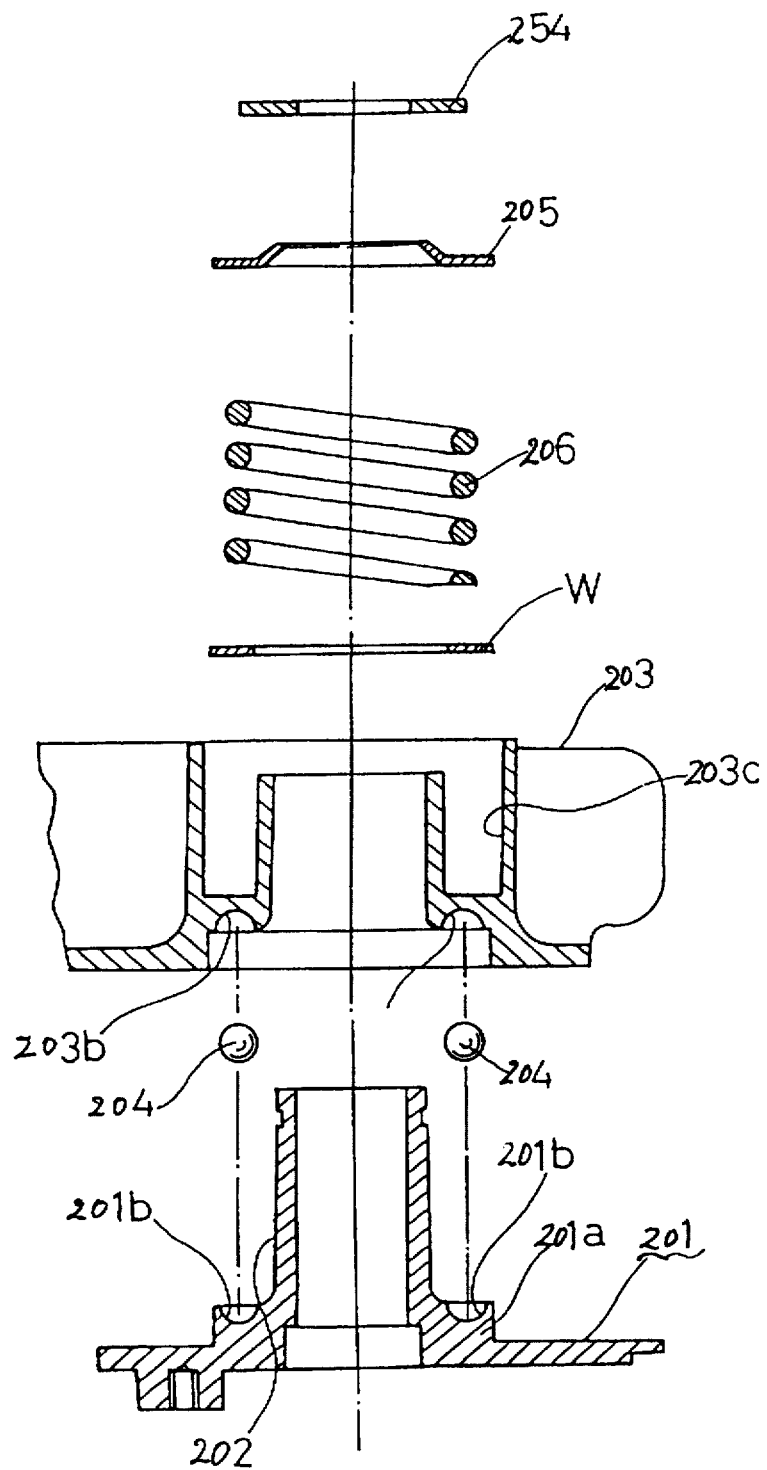
FIG. 26 is an exploded cross-sectional view of a bracket and associated parts.

As shown in FIGS. 24 and 26, a circular array of recesses 203b are defined in a lower surface of a base portion 203a of a bracket 203 around a central axis of a fixed shaft or sleeve shaft 202, and balls 204 are fixedly mounted in the respective recesses 203b. The base portion 201 has a central step 201a having engaging holes 201b defined in an upper surface thereof. The balls 204 have portions projecting downwardly from the recesses 203b in the base portion 203a, and the projecting portions of the balls 204 engage in the respective engaging holes 201b for positioning a mirror housing H with respect to a base member 201.

The base portion 203a has a circular groove 203c defined therein which accommodates a washer W. A coil spring 206 is disposed between the washer W and a retaining ring 205 that is vertically immovably attached to an outer circumferential surface of the fixed shaft 202 for normally urging the bracket 203 against the base member 201 under the resiliency of the coil spring 206 thus keeping the balls 204 engaging in the respective holes 201b.

Figure 25:
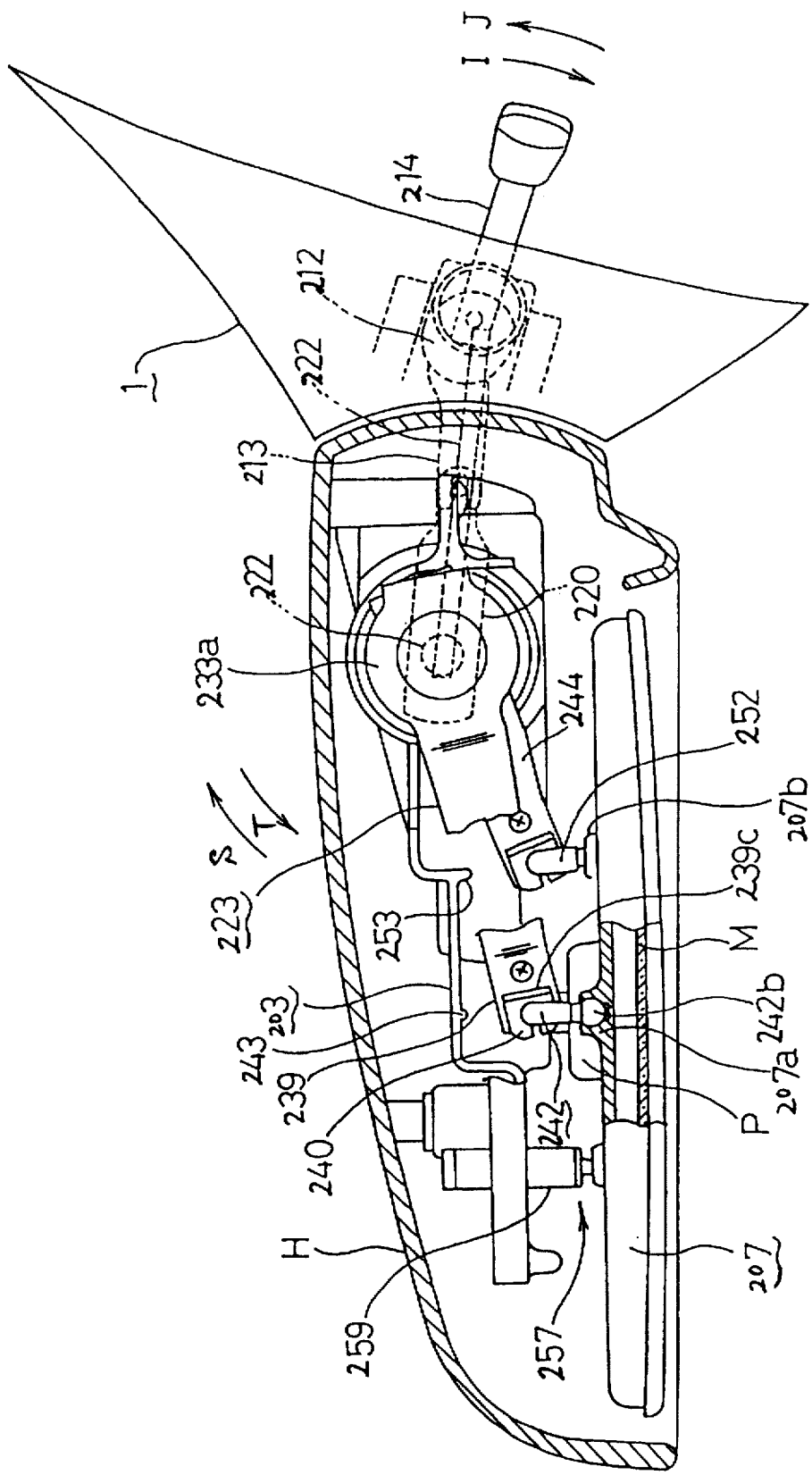
FIG. 25 is a horizontal cross-sectional view of the automotive rearview mirror shown in FIG. 24.
Figure 29:
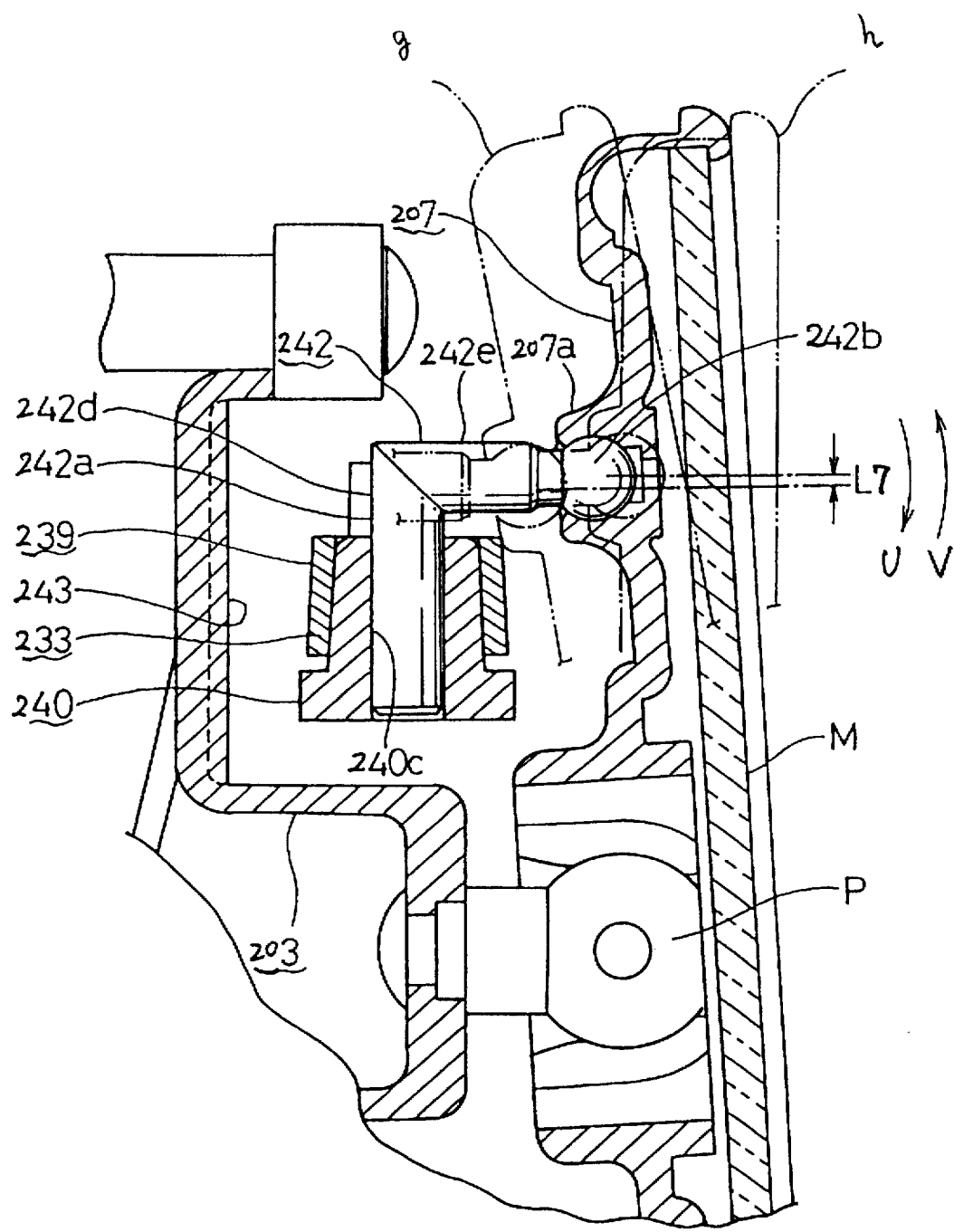
FIG. 29 is a cross-sectional view taken along line XXIX—XXIX of FIG. 24.

A pivot P is mounted on a front side of the bracket 203. As shown in FIGS. 24, 25, and 29, a mirror holder 207 which holds a rearview mirror M is tiltably supported at its back by the pivot P.

Figure 30:
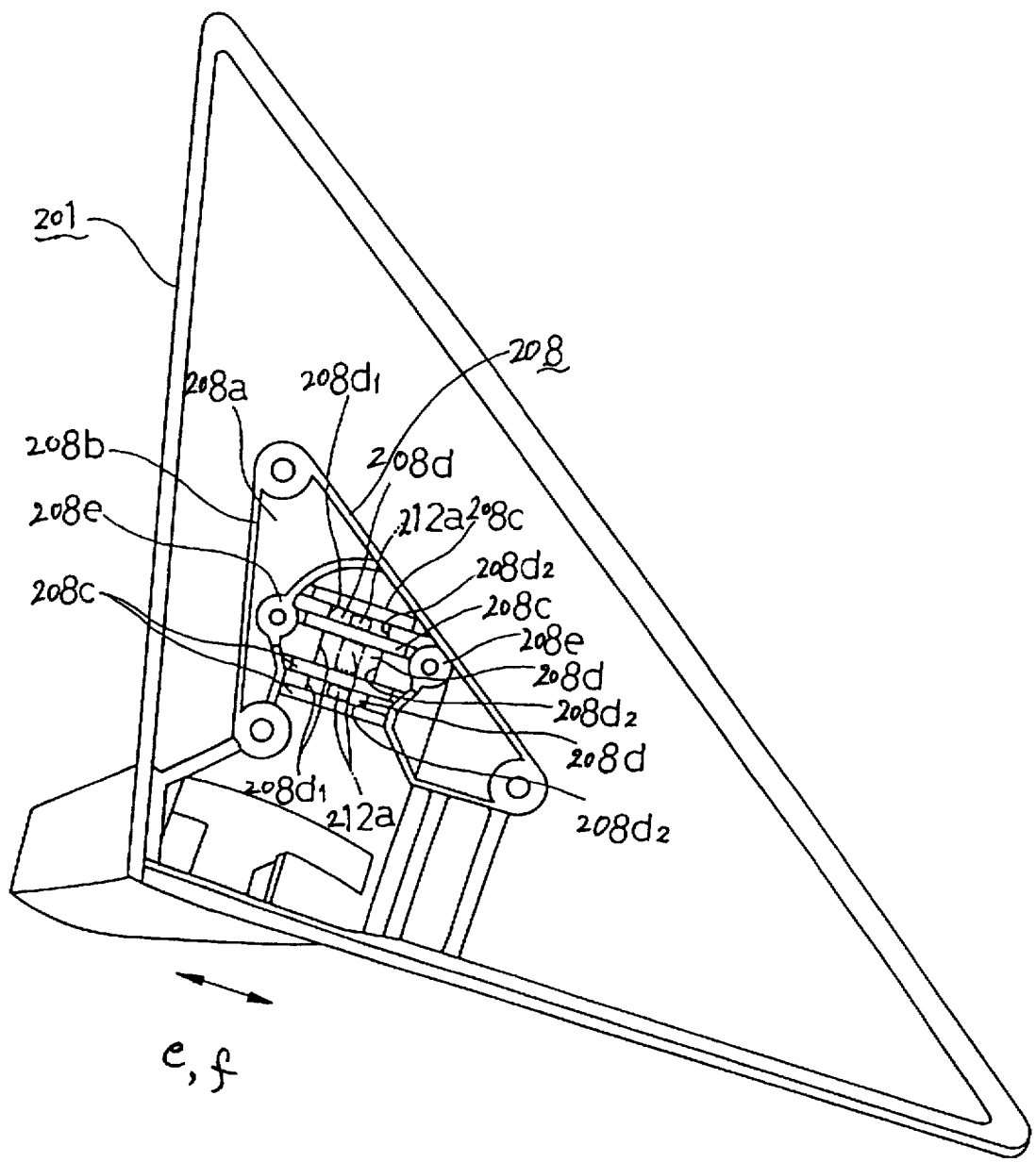
FIG. 30 is a view of a base member as viewed in the direction indicated by the arrow XXX in FIG. 24.
Figure 37:
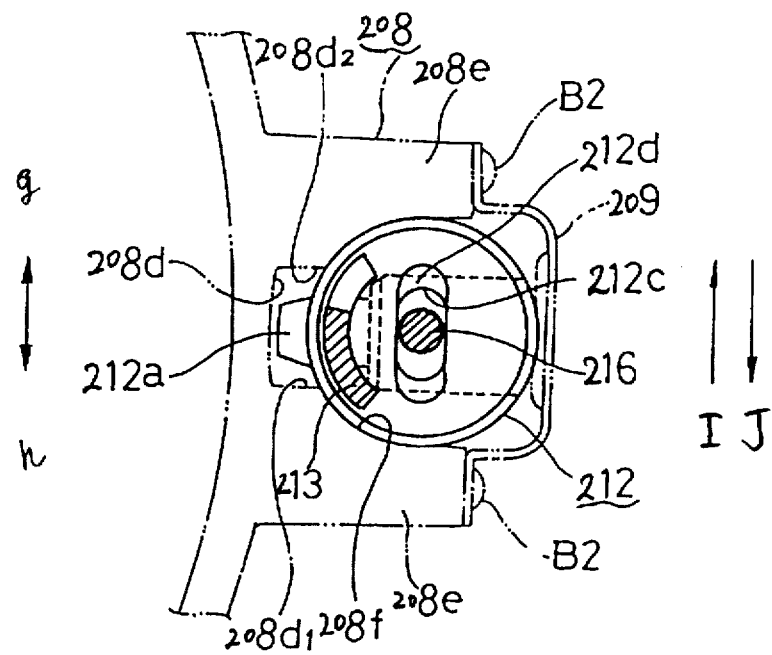
FIG. 37 is a cross-sectional view taken along line XXXVII—XXXVII of FIG. 24.

As shown in FIGS. 30 and 37, a support member 208 integral with the base member 201 near the automobile body has an upstanding wall 208b on an outer edge of a block 208a, a plurality of parallel ribs 208c on the block 208a, a plurality of grooves 208d defined between the ribs 208c, and a plurality of bosses 208e on the wall 208b. The grooves 208d have a certain width in the direction indicated by the arrow e or f in FIG. 30 or g, h in FIG. 37), and have stoppers 208d1, 208d2 at their ends.

As shown in FIG. 37, the wall 208b has an arcuate recess 208f defined therein.

Figure 31:
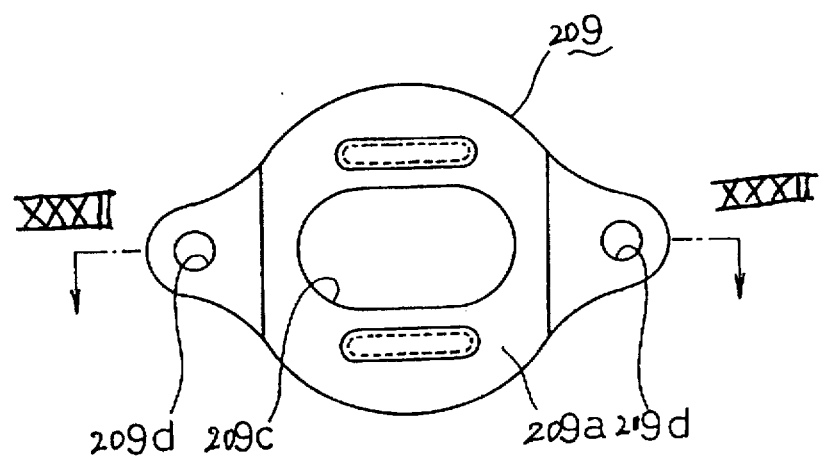
FIG. 31 is a view of a presser plate as viewed in the direction indicated by the arrow XXXI in FIG. 24.
Figure 32:
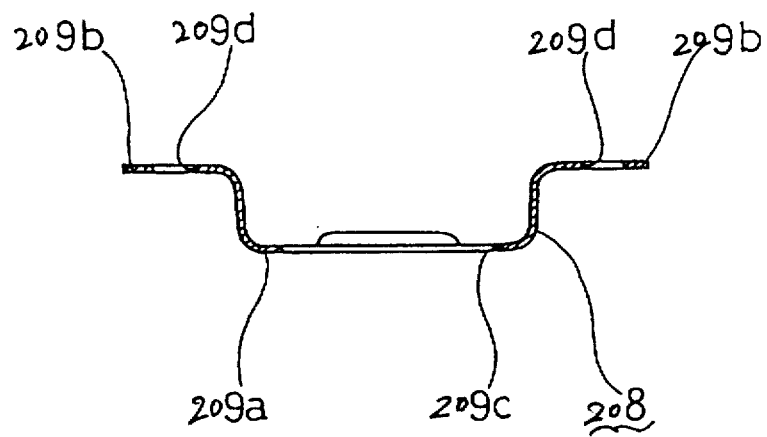
FIG. 32 is a cross-sectional view taken along line XXXII—XXXII of FIG. 31.
Figure 33:
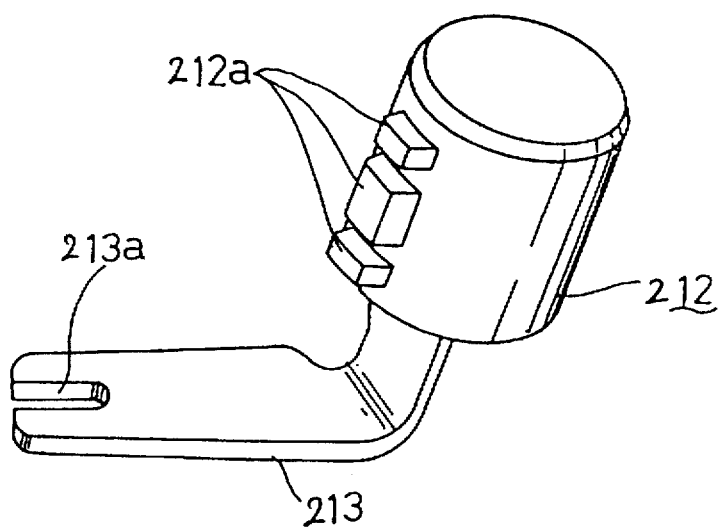
FIG. 33 is a perspective view of a rotational body on a control lever.
Figure 34:
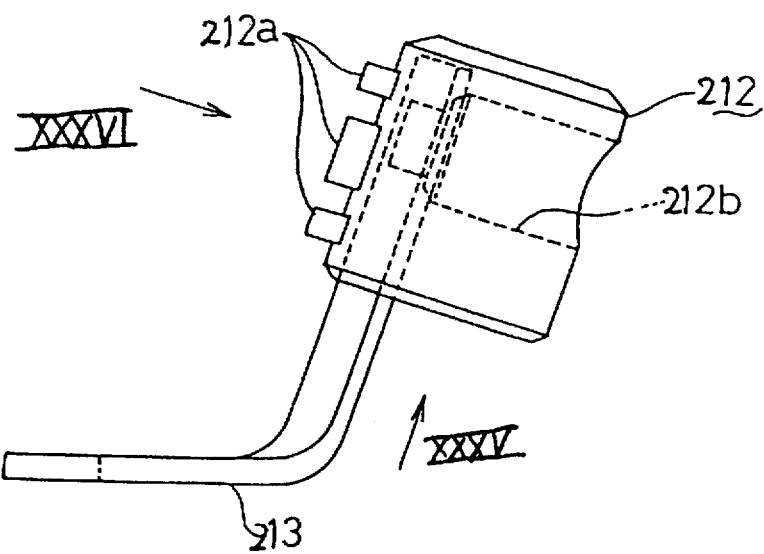
FIG. 34 is a side elevational view of the rotational body shown in FIG. 33.
Figure 35:
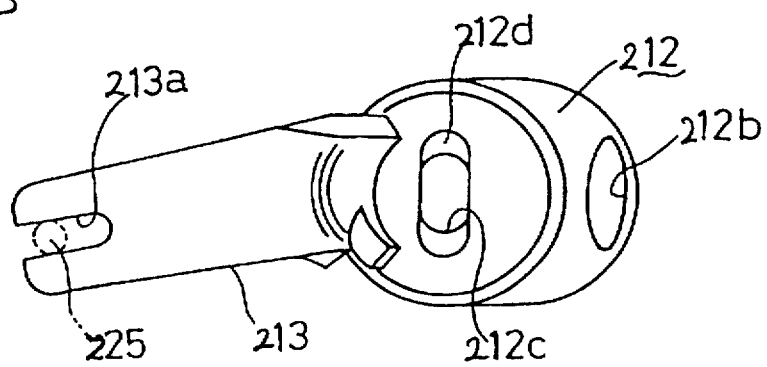
FIG. 35 is a view of the rotational body as viewed in the direction indicated by the arrow XXXV in FIG. 34.

A presser plate 209 is fastened to a front side of the support member 208. As shown in FIGS. 31 and 32, the presser plate 209 comprises a substantially circular central portion 209a and a pair of attachment flanges 209b bent at a right angle from opposite ends of the central portion 209a and extending radially outwardly. The central portion 209a has an oblong hole 209c extending horizontally. The attachment flanges 209b have respective circular holes 209d defined therein. The presser plate 209 is fastened to the support member 208 by screws B2 (FIG. 37) that are threaded into the respective bosses 208e.

Between the support member 208 and the presser plate 209, there is disposed a larger rotational body 212 engaging in the recess 208f and rotatable with respect to the support member 208 and the presser plate 209.

As shown in FIGS. 33 through 37, the larger rotational body has a cylindrical shape, and an arm 213 has an upper end embedded in the rotational body 212 and extends obliquely downwardly and then horizontally with a recess 213a defined in its distal end.

The larger rotational body has a vertical array of integral teeth 212a on its side near the support member 208 which engage respectively in the grooves 208d of the support member 208 for positioning the larger rotational body in the axial direction thereof. As shown in FIGS. 30 and 37, the teeth 212a have a horizontal width smaller than that of the grooves 208d. Therefore, the larger rotational body can be angularly moved an interval corresponding to the width of the grooves 208d. When the teeth 212a abut against the stoppers 208d1, 208d2 of the grooves 208d, the larger rotational body is prevented from rotating further.

Figure 36:
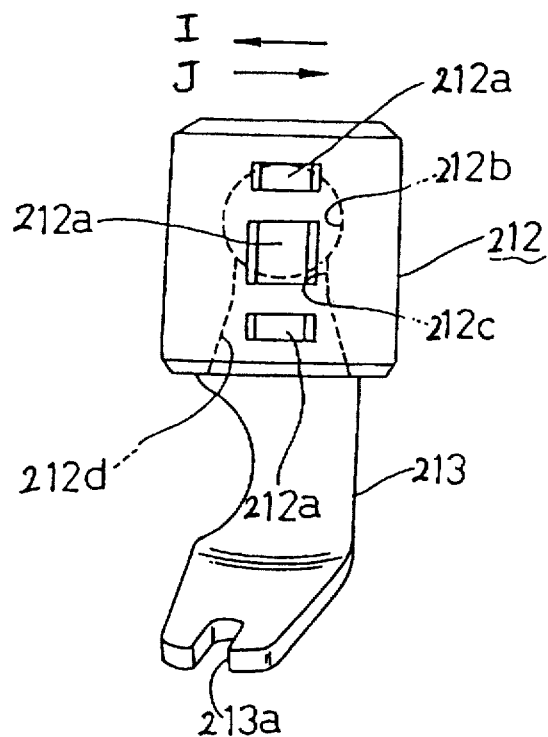
FIG. 36 is a view of the rotational body as viewed in the direction indicated by the arrow XXXVI in FIG. 34.

As shown in FIGS. 34 through 37, the larger rotational body has a diametrical hole 212b of circular cross section whose axis extends perpendicularly to the axis of the larger rotational body. As shown in FIG. 36, the larger rotational body also has a hole 212c defined axially therein and having an upper end communicating with the hole 212b and a lower end opening at the bottom of the larger rotational body. The hole 212c has a tapered portion 212d whose diameter is progressively larger downwardly.

A smaller rotational body 215, which is of a diameter smaller than the diameter of the larger rotational body 212, is formed on an end of a control lever 214, and fitted in the hole 212b in the larger rotational body 212. The control lever 214 extends through the oblong hole 209c in the presser plate 209, and has the opposite knob end projecting into the passenger compartment of the automobile body. The smaller rotational body 215 has a hole 214a defined therein, and a swing rod 216 is pressed into the hole 214a and hence fixed to the control lever 214. Since the swing rod 216 is inserted in the hole 212c, the swing rod 216 is swingable within the tapered portion 212d of the hole 212c in the direction indicated by the arrow I or J in FIGS. 36, 37.

FIGS. 46 through 50 illustrate a modification of the larger rotational body 212. A modified rotational body 312 is formed by pressing a blank to shape.

The rotational body 312 is of a cylindrical shape, and an arm 313 integrally extends from the rotational body 312. The rotational body 312 has a hole 307 defined therein near a support member 308, a hole 371 defined therein remote from the support member 308, and a vertical recess 372 defined in a side thereof.

Figure 49:
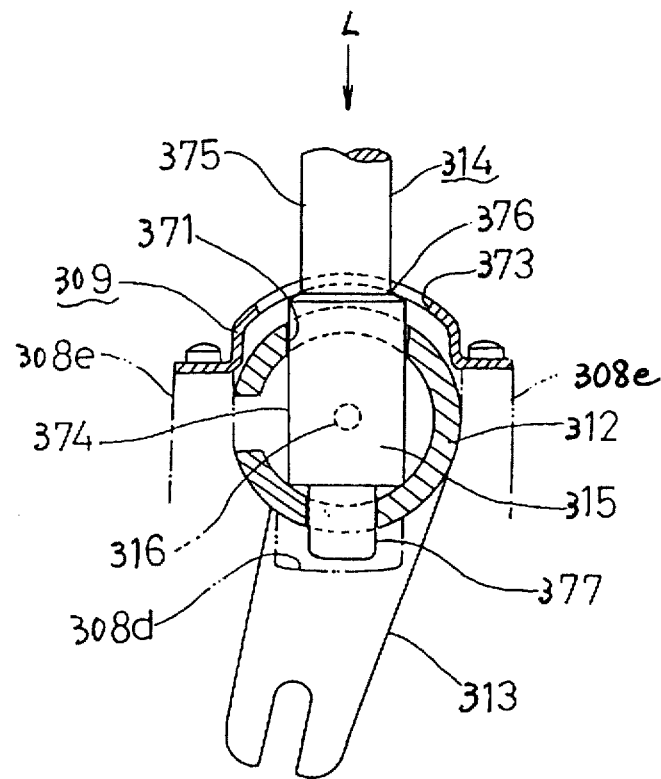
FIG. 49 is a cross-sectional view taken along line IL—IL of FIG. 46, with a control lever and a presser plate mounted on the rotational body.
Figure 50:
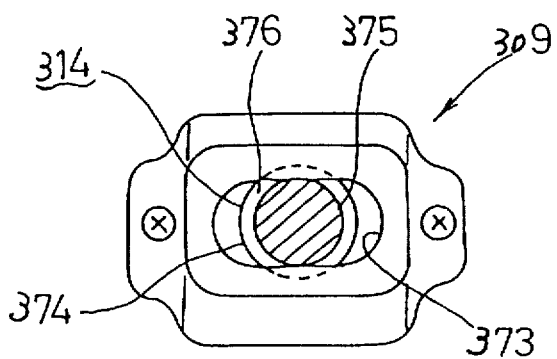
FIG. 50 is a view as viewed in the direction indicated by the arrow L in FIG. 49.

As shown in FIG. 49, a presser plate 309 is of an arcuate cross section. As shown in FIG. 50, the presser plate 309 has a horizontally oblong hole 373 defined therein.

As illustrated in FIG. 49, a control lever 314 has a larger-diameter portion 374 rotatably fitted in the hole 371. As shown in FIGS. 49 and 50, the control lever 314 also has a smaller-diameter portion 375 next to the larger-diameter portion 374, the smaller-diameter portion 375 being inserted in the oblong hole 373 for sliding movement therealong. The larger-diameter 374 corresponds to the smaller rotational body 215.

As shown in FIG. 50, the vertical dimension or width of the oblong hole 373 is greater than the smaller-diameter portion 375 of the control lever 314, but smaller than the larger-diameter portion 374 thereof. The control lever 314 has a spherically tapered portion 376 between the larger- and smaller-diameter portions 374, 375 which engages a peripheral edge of the oblong hole 373.

A flat protrusion 377 integral with the distal end of the control lever 314 engages in a groove 308d defined in the support member 308.

The rotational body 312 can easily be manufactured by pressing. The protrusion 377 of the control lever 314 may function as the teeth 212a shown in FIG. 24.

Figure 28:
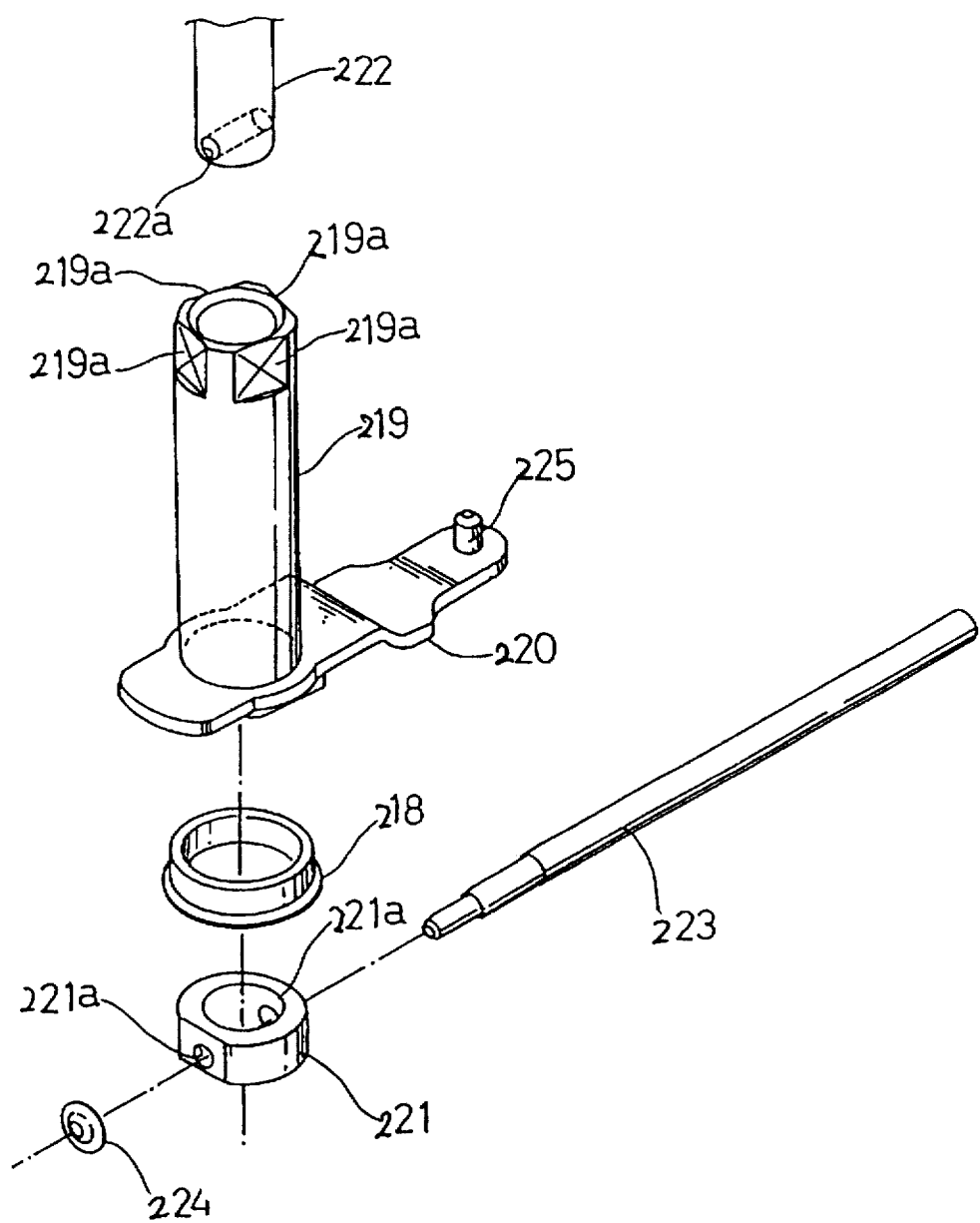
FIG. 28 is an exploded perspective view of a tubular shaft, a rod shaft, and associated parts.

As shown in FIGS. 24 and 28, a tubular shaft 219 is rotatably disposed in the fixed shaft 202, and an end of an arm 220 is fixed to the lower end of the tubular shaft 219. A small-diameter rod shaft 222 is rotatably disposed in the tubular shaft 219. As shown in FIG. 28, a retaining ring 221 is fitted over the lower end of the rod shaft 222. An arm 223 has an end inserted through a through hole 222a defined diametrically in the rod shaft 222 and through holes 221a defined diametrically in the retaining ring 221. The end of the arm 223 which has inserted through the through holes 222a, 221a is fixed by a push nut 224. A collar 218 is interposed between the fixed shaft 202 and the tubular shaft 219.

Figure 38:
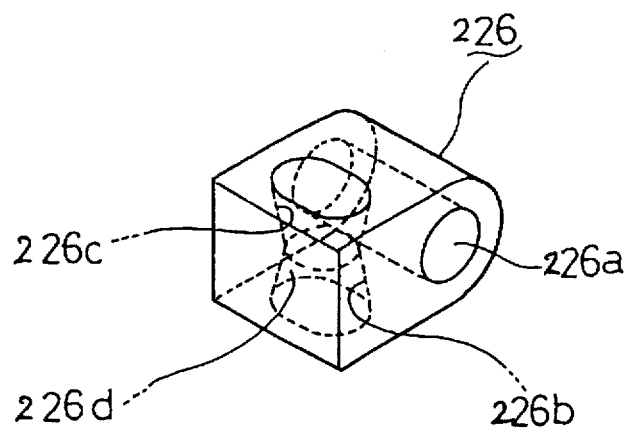
FIG. 38 is a perspective view of a coupling for use between an arm for a control lever and an arm for a shaft.
Figure 39:
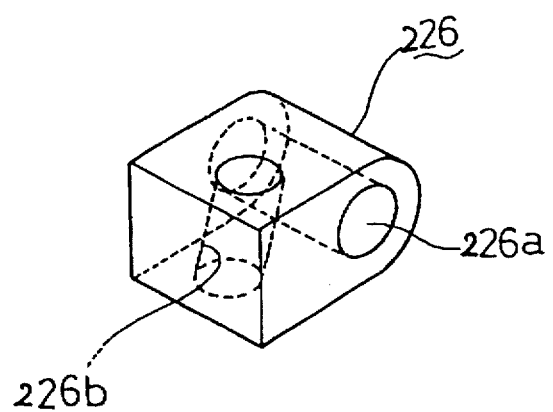
FIG. 39 is a perspective view of a modified coupling.

An upstanding engaging pin 225 is mounted on the upper end of a distal end of the arm 220, and engages in a recess 213a that is defined in a distal end of the arm 213. The other end of the arm 223 is coupled to the swing rod 216 by a coupling 226. As shown in FIG. 38, the coupling 226 has a horizontal hole 226a in which the arm 223 is fitted, and a vertical hole 226b in which the swing rod 216 is inserted. The vertical hole 226b has upper and lower tapered portions 226c, 226d. As shown in FIG. 39, the vertical hole 226b may be a straight hole with no tapered portions.

Figure 27:
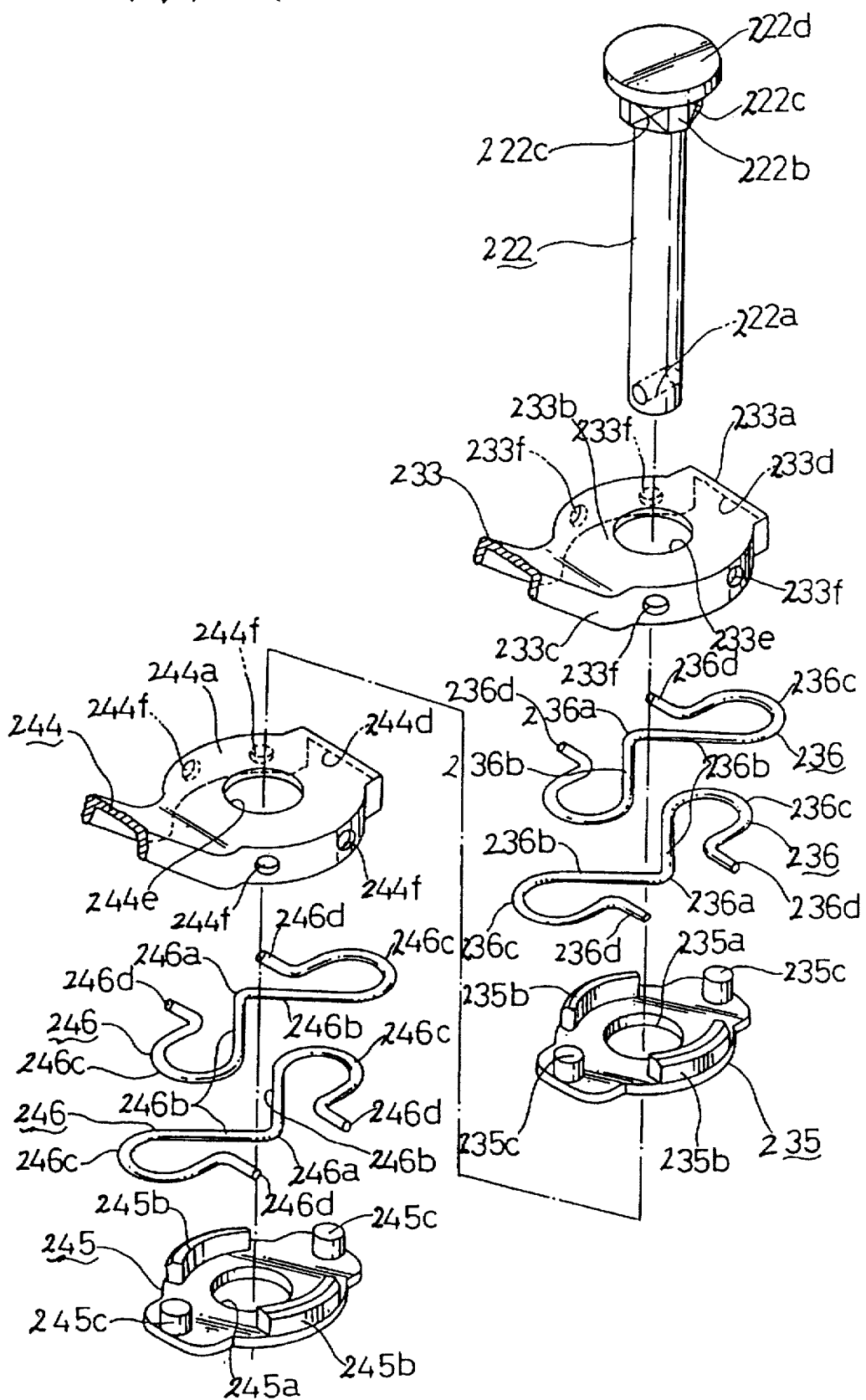
FIG. 27 is an exploded perspective view of a clutch and associated parts.
Figure 40:
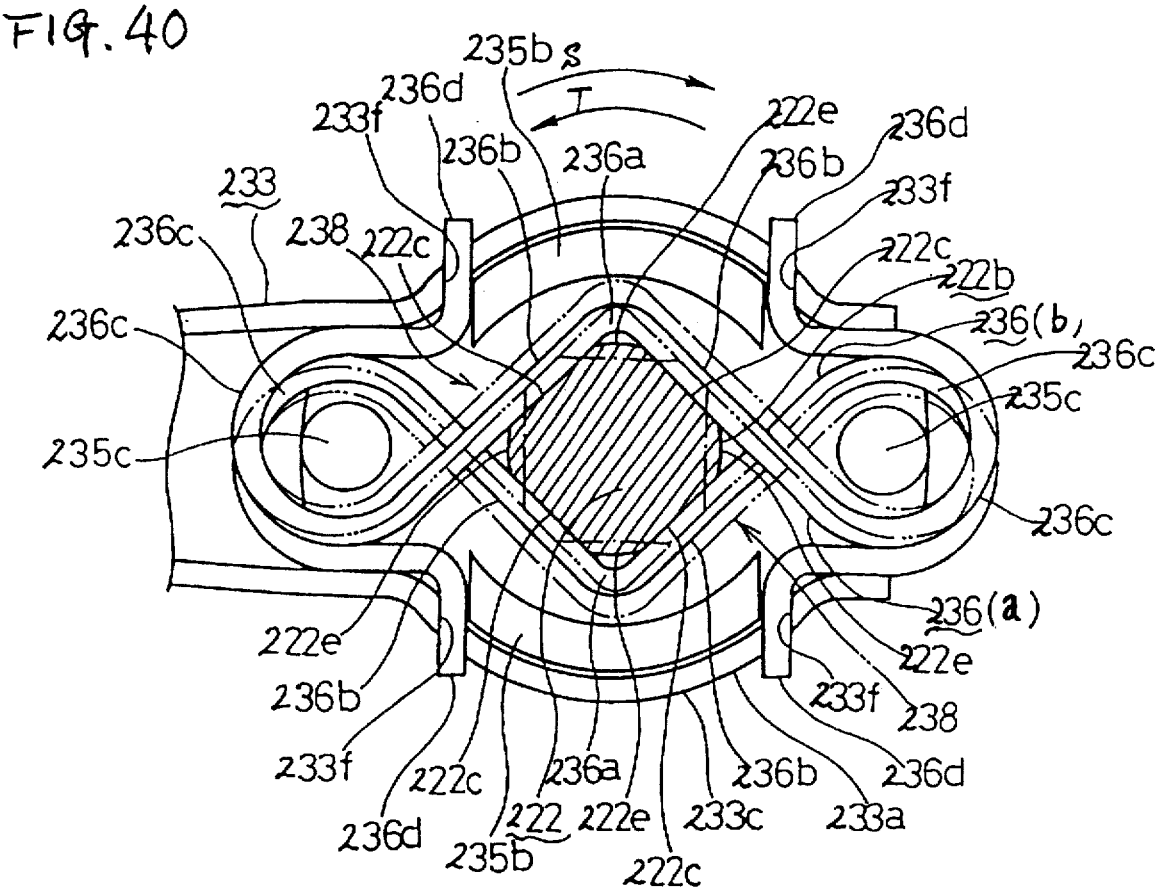
FIG. 40 is a cross-sectional view taken along line XL—XL in FIG. 24, showing a vertical angle adjusting arm with springs.

As shown in FIGS. 24, 27, and 40, the rod shaft 222 has a cylindrical large-diameter portion 222b on its upper portion which has two pairs of diametrically opposite flat engaging surfaces 222c on its outer circumference, and a holder flange 222d on the upper end of the large-diameter portion 222b.

Each of the engaging surfaces 222c has a horizontally large width. As shown in FIG. 40, therefore, the large-diameter portion 222b is of a substantially square shape with ridges 222e between the engaging surfaces 222c.

A metallic arm 233 is rotatably supported on the shaft 222 and includes a flat base 233a disposed around the shaft 222. The flat base 233a comprises an upper panel 233b and an outer circumferential flange 233c extending around the upper panel 233b. The flange 233c has an opening 233d defined in an end thereof. The upper panel 233b has a circular hole 233e defined centrally therein, and the flange 233c has a plurality of holes 233f defined therein. The rod shaft 222 is rotatably fitted in the hole 233e.

A support member 235 as of synthetic resin, for example, is disposed in the base 233a. As shown in FIGS. 27 and 40, the support member 235 is in the form of a flat member, and has a central hole 235a defined therein through which the rod 233 is rotatably inserted. The support member 235 has a pair of diametrically opposite walls 235b and a pair of diametrically opposite cylindrical posts 235c. The walls 235b and the posts 235c have upper ends held against the lower surface of the base 233a.

Two rod-shaped springs 236 are mounted on the support member 235 and extend in the longitudinal direction of the arm 233. As shown in FIGS. 27 and 40, each of the springs 236 comprises a substantially L-shaped central portion 236a, two side portions 236b extending oppositely therefrom, two arcuate portions 236c extending from the respective side portions 236b as main resilient portions, and two ends projecting laterally from the arcuate portions 236c, respectively, as engaging portions 236d.

As shown in FIG. 40, the side portions 236b of the springs 236 are held flatwise against the engaging surfaces 222c of the rod shaft 222 in linear contact therewith. The arcuate portions 236c are positioned around the cylindrical posts 235c, and the engaging portions 236d engage in respective holes 233f defined in the base 233a. The engaging surfaces 222c and the springs 236 jointly serve as a clutch 238. Since the sides 236b of the springs 236 are normally resiliently held against the engaging surfaces 222c, and hence the clutch 238 is engaged, the rod shaft 222 are engaged by the springs 236. Thus, rotation of the rod shaft 222 is transmitted through the springs 236 to the arm 233. Before being mounted in place, the two side portions 236b of each of the springs 236 lie at an angle greater than 90° with respect to each other. When mounted, the two side portions 236b lie at about 90° with respect to each other, i.e., the two side portions 236b are flexed in a direction toward each other, engaging the engaging surfaces 222c under increased forces.

Figure 41:
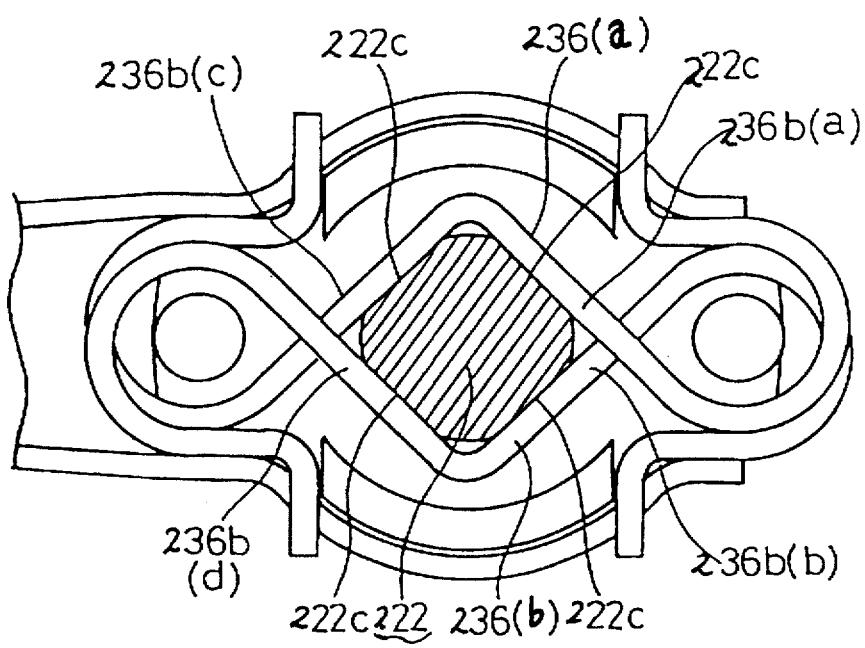
FIG. 41 is a view similar to FIG. 40, showing the vertical angle adjusting arm with modified springs.

In the second embodiment, one of the springs 236, indicated by 236(a) in FIG. 40, is placed in its entirety on the other spring indicated by 236(b) in FIG. 40. However, as shown in FIG. 41, one side portion 236b, indicated by 236b(a), of one of the springs 236, indicated by 236(a) in FIG. 41, may be placed over a side portion 236b, indicated by 236b(b), of the other spring 236, indicated by 236(b) in FIG. 41, and the other side portion 236b, indicated by 236b(c), of the one of the springs 236(a) may be placed beneath a side portion 236b, indicated by 236b(d), of the other spring 236(b). Stated otherwise, the opposite side portions 236b of the springs 236 may be positioned in vertically staggered relationship to each other.

Figure 44A:
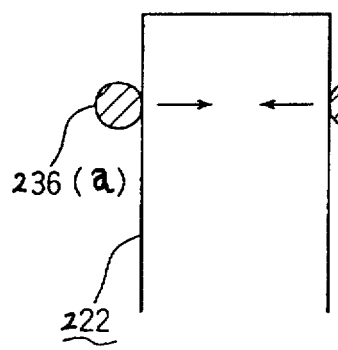
FIGS. 44(a) and 44(b) are views illustrative of the directions in which forces are applied from the springs shown in FIGS. 40 and 41 to the rod shaft.
Figure 44B:
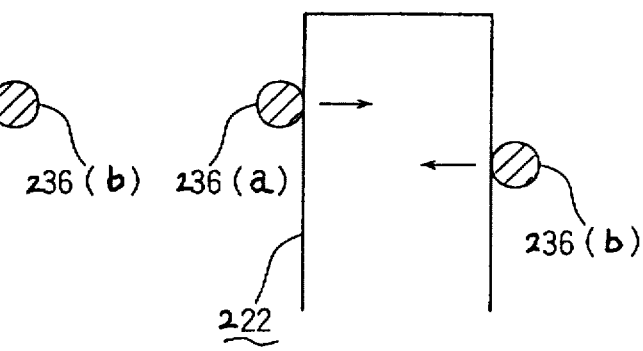

With the arrangement shown in FIG. 41, the springs 236 do not exert forces tending to tilt the rod shaft 222. More specifically, when the two springs 236(a), 236(b) are placed one on the other as shown in FIG. 40, since the springs 236(a), 236(b) apply forces to the rod shaft 222 at different vertical positions as shown in FIG. 44(b), they produce a moment to tilt the rod shaft 222. When the two springs 236(a), 236(b) are positioned as shown in FIG. 41, however, since the springs 236(a), 236(b) apply forces to the rod shaft 222 at substantially the same vertical position as shown in FIG. 44(a), they do not produce a moment to tilt the rod shaft 222.

Figure 42:
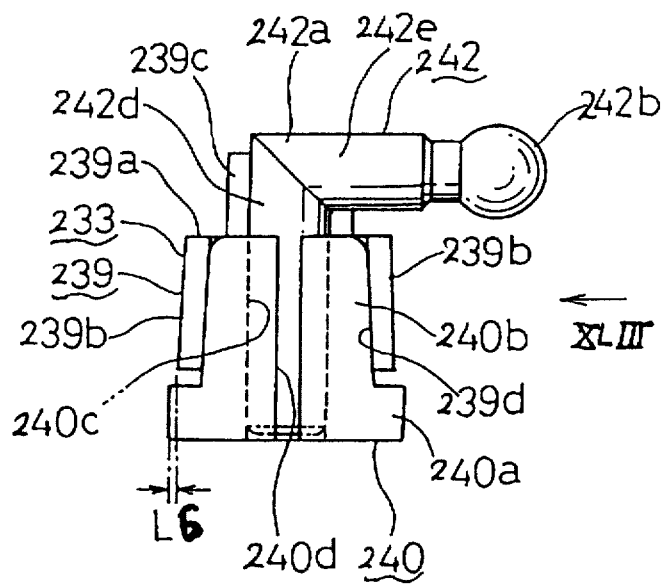
FIG. 42 is a view of a pivot member as viewed in the direction indicated by the arrow XLII in FIG. 24.
Figure 43:
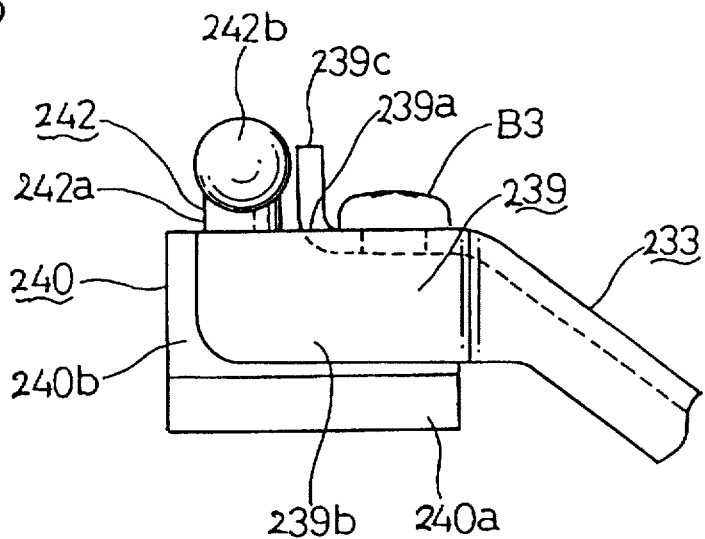
FIG. 43 is a view of the pivot member as viewed in the direction indicated by the arrow XLIII in FIG. 42.

As shown in FIG. 24, the arm 233 is inclined obliquely upwardly away from the automobile body, and has a horizontal end portion 239 positioned behind a mirror holder 207. As shown in FIGS. 42 and 43, the horizontal end portion 239 has a channel-shaped cross section composed of an upper panel 239a and a pair of spaced side walls 239b extending downwardly from opposite edges of the upper panel 239a. The upper panel 239a has an outer portion extending upwardly into a stopper 239c. The arm 233 has a vertical engaging opening 239d positioned outwardly of the stopper 239c.

A support member 240 of a slightly soft material such as synthetic resin is fitted in the engaging opening 239d. As shown in FIGS. 42 and 43, the support member 240 comprises a base portion 240a fixed to the arm 233 by a screw B3, and a support portion 240b integral with the upper surface of an outer end of the base portion 240a. The support portion 240b has a vertically through hole 240c of circular cross section, and a vertical slit 240d defined in an outer end thereof.

As illustrated in FIG. 42, the base portion 240a has a width greater than the distance between the outer surfaces of the side walls 239b of the arm 233 such that an end of the base portion 240a projects from an end of one of the side walls 239b by a distance L6. When the arm 233 swings toward the bracket 203, the arm 233 does not hit the bracket 203, but the support member 240 engages the bracket 203 because the end of the base portion 240a projects from the side wall 239b by the distance L6. Since the support member 240 is made of synthetic resin, no large noise is produced when the support member 240 hits the bracket 203.

A pivot member 242 which is supported on the support member 240 comprises a shaft member 242a and a ball 242b integral with the shaft member 242a. The shaft member 242a comprises a first shaft portion 242d slidably fitted in the through hole 240c and a second shaft portion 242e bent at a right angle from the upper end of the first shaft portion 242d, the ball 242b being mounted on the distal end of the second shaft portion 242e. As shown in FIG. 29, the ball 242b is swingably fitted in a spherical recess 207a positioned on the back of the mirror holder 207 above the pivot P.

In FIGS. 24, 25, and 29, the bracket 203 has a vertical rib-shaped stopper 243 on its surface facing the arm 233. When the automotive rearview mirror assembly is manufactured, the mirror holder 207 is assembled on the pivot member 242 from its front side. More specifically, the mirror holder 207 is moved from the right to the left in FIG. 29 until the ball 242b is fitted into the spherical recess 207a. At this time, the arm 233 is pushed toward the bracket 3 by the mirror holder 207. Since the bracket 203 has the stopper 243, the support member 240 of the arm 233 abuts against the stopper 243, which then prevents the arm 233 from being displaced further or secures the arm 233 in position. Consequently, the ball 242b can easily be fitted into the spherical recess 207a. In the second embodiment, as shown in FIGS. 24, 25, and 43, the stopper 239c of the arm 233 is positioned laterally of the pivot member 242. Therefore, when the ball 242b is fitted into the spherical recess 207a, the pivot member 242 is prevented by the stopper 239c from being turned laterally. Thus, the ball 242b can easily be fitted into the spherical recess 207a.

The pivot member 242 serves as part of a coupling means which transmits control movement of the control lever 214 through the arm 233 to the mirror holder 207 for tilting the mirror holder 207.

As shown in FIG. 28, the tubular shaft 219 has two pairs of diametrically opposite flat engaging surfaces 219c on its outer circumference, which are identical to the engaging surfaces 222c on the rod shaft 222. Therefore, the tubular shaft 219 is of a substantially square shape as with the large-diameter portion 222b.

An arm 244 is rotatably supported on an upper portion of the tubular shaft 219. The arm 244 is of the same structure as the arm 233 except for the length thereof. As shown in FIG. 27, a support member 245 is disposed in a base 244a of the arm 244, and springs 246 engaging the engaging surfaces 219a of the shaft 219 are disposed on the support member 245.

The base 244a, the support member 245, and the springs 246 are identical in structure to the base 233a, the support member 235, and the springs 236, respectively. The base 244a has an opening 244d and holes 244e, 244f, and the support member 245 has a hole 245a, walls 245b, and cylindrical posts 245c. The springs 236 have respective central portions 246a, respective side portions 246b, respective arcuate portions 246c, and respective engaging portions 246d. The base 244a, the support member 245, and the springs 246 are assembled together in the same manner as the base 233a, the support member 235, and the springs 236. The engaging surfaces 219a and the springs 246 jointly serve as a clutch 247.

The arm 244 has a horizontal end portion 248 which is structurally identically to the horizontal portion 239 of the arm 233. The horizontal portion 248 has a stopper 248c and a support member 250 is fitted therein. A pivot member 252 attached to the support member 250 is also identical in structure to the pivot member 242. The pivot member 252 has a shaft portion 252a and a ball 252b, and is vertically slidable with respect to the support member 250.

The structure at the outer end of the arm 233 and the structure at the outer end of the arm 244 are identical to each other except for the positions of the balls 242b, 252b.

In FIG. 25, the bracket 203 has a rib-shaped stopper 253 near the arm 244 for stopping the arm 244 in the same manner as the stopper 243.

In FIG. 24, the arm 244 is supported by a bearing 254. The bracket 203 has stoppers 255, 256 for holding the mirror holder 207 against tilting movement. A vibroisolating device 257 has a shank 259 attached to the bracket 203 and having an end swingably attached to the back of the mirror holder 207, and a spring 260 mounted on the bracket 203 and supporting the shank 259 for preventing the mirror holder 207 from vibrating.

A process of operating the mirror angle adjusting device according to the second embodiment to adjust the angle of the rearview mirror M will be described below.

When the control lever 214 is turned about its own axis in the direction indicated by the arrow Q or R in FIGS. 24 and 25, the swing rod 216 swings about the control lever 214 in the longitudinal direction of the automobile body, i.e., in a direction normal to the sheets of FIG. 24. The swinging movement of the swing rod 216 is transmitted through the coupling 226 to the arm 223, which is now swung about the rod shaft 222 in the longitudinal direction of the automobile body.

Under the normal condition shown in FIG. 40, the side portions 236b of the springs 236 resiliently engage the engaging surfaces 222c, i.e., the clutch 238 is engaged. Therefore, when the rod shaft 222 is turned about its own axis in the direction indicated by the arrow S or T in FIGS. 25, 40, the angular movement of the rod shaft 222 is transmitted through the clutch 238 to the arm 233, which is turned about the shaft 222 in the direction S or T. The rotation of the arm 233 causes the ball 242b to push or pull the mirror holder 207 in the longitudinal direction of the automobile body. The mirror holder 207 is now tilted vertically about the pivot P in the direction indicated by the arrow V or U in FIG. 29, as indicated by the imaginary lines g, h.

When the mirror holder 207 is tilted, the mirror holder 207 is swung about the pivot P. Thus, the position of the spherical recess 207a moves vertically as the mirror holder 207 is tilted in the direction V or U in FIG. 29. If the mirror holder 207 is tilted from the solid-line position in FIG. 29 to the position g in the direction V, the spherical recess 207a moves back and downwardly by a distance L7. This is because the spherical recess 207a effects an arcuate motion about the pivot P when the mirror holder 207 is tilted.

Figure 45:
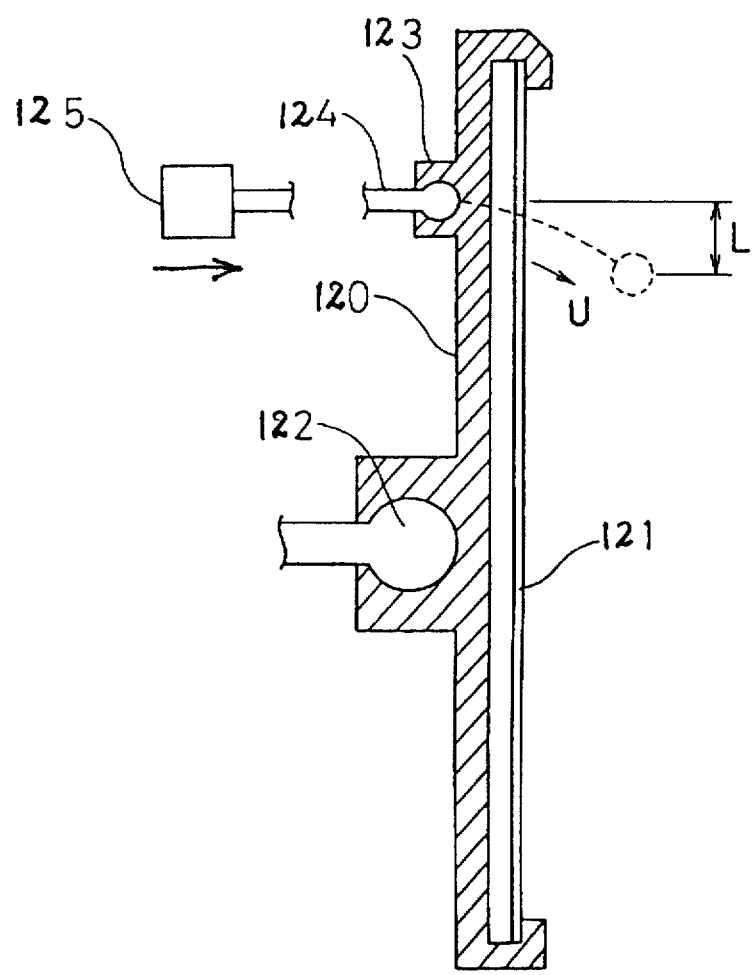
FIG. 45 is a vertical cross-sectional view of a conventional mirror holder support structure.
Figure 46:
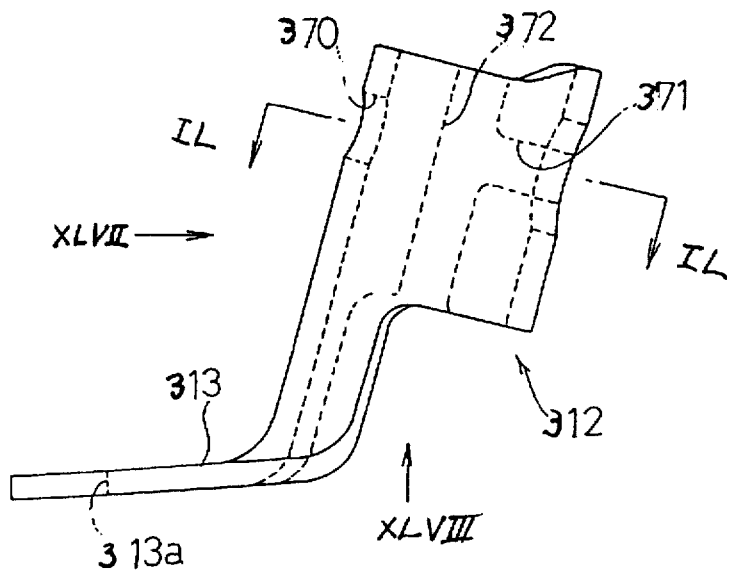
FIG. 46 is a side elevational view of a modification of the rotational body shown in FIG. 33.
Figure 47:
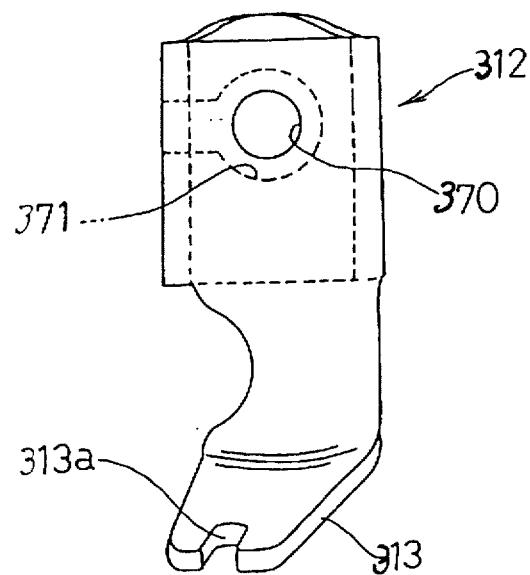
FIG. 47 is a view of the modified rotational body as viewed in the direction indicated by the arrow XLVII in FIG. 46.
Figure 48:
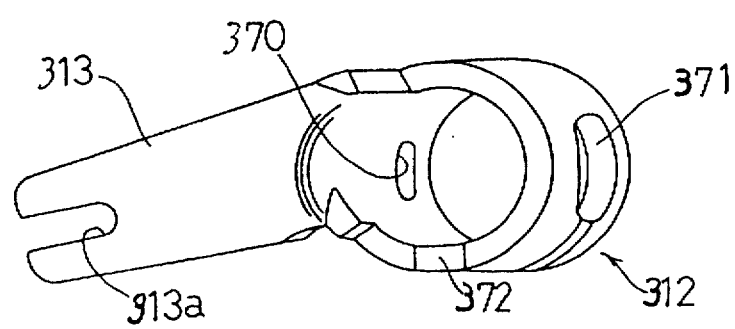
FIG. 48 is a view of the modified rotational body as viewed in the direction indicated by the arrow XLVIII in FIG. 46.

Such movement of the spherical recess 207a will be described below in greater detail. In conventional automotive rearview mirror assemblies, since the spherical recess on the back of the mirror holder is displaced off the pivot member, the spherical recess moves arcuately about the pivot member when the mirror holder is tilted about the pivot member. Therefore, the spherical recess is shifted vertically or horizontally. More specifically, as shown in FIG. 45, when an operating arm 125 moves in the direction indicated by the arrow to tilt a mirror holder 120 downwardly in the direction indicated by the arrow U about a pivot member 122, a spherical recess 123 is also tilted in the direction U, making an arcuate motion about the pivot member 122 as viewed in side elevation. Therefore, after the mirror holder 120 is tilted, the spherical recess 123 is shifted downwardly by a distance L. Since the vertical position of the operating arm 125 remains unchanged, a coupling 124 whose distal end is coupled to the spherical recess 123 is inclined downwardly. The inclination of the coupling 124 increases as the operating arm 125 moves in the direction U. As the coupling 124 is inclined, the force applied by the operating arm 125 to tilt the mirror holder 120 is reduced, thus reducing the tilted movement of the mirror holder 120.

According to the second embodiment, however, inasmuch as the shaft member 242a supporting the ball 242b is vertically movably disposed in the through hole 240c in the support member 240, the pivot member 242 moves downwardly as a whole as the spherical recess 207a which supports the ball 242b descends. Therefore, the movement of the arm 233 is smoothly transmitted to the mirror holder 207 without tilting the pivot member 242, so that any reduction in the force applied to tilt the mirror holder 207, and hence any reduction in the inclination of the mirror holder 207 are prevented from occurring.

When the control lever 214 is moved along the oblong hole 209a in the longitudinal direction of the automobile body, i.e., in the direction indicated by the I or J in FIG. 25, the rotational member 212 is turned about its own axis, and the arm 213 swings about the rotational member 212 in the longitudinal direction of the automobile body. The swinging movement of the arm 213 causes the arm 220 to swing about the tubular shaft 219 in the longitudinal direction of the automobile body, whereupon the tubular shaft 219 turns about its own axis. Since the springs 246 resiliently engage the engaging surfaces 219a of the tubular shaft 219, i.e., the clutch 247 is engaged, the arm 244 is turned about the tubular shaft 219 in the longitudinal direction or the automobile body, i.e., in the direction indicated by the arrow S or T. The rotation of the arm 244 causes the ball 252b to push or pull the mirror holder 207 in the longitudinal direction of the automobile body. The mirror holder 207 is now tilted horizontally about the pivot P, thus adjusting the horizontal angle of the rearview mirror M.

It is assumed that a large force is applied to the mirror housing N from the front side of the automobile body, tilting the mirror housing H in the rearward direction of the automobile body. Since the bracket 203 is fixed to the mirror housing H, the applied force is transmitted to the bracket 203, moving the bracket 203. The balls 204 are forced out of the holes 201b, and the bracket 203 is turned rearwardly (in the direction T in FIG. 25) with the mirror housing H about the fixed shaft 202. When the bracket 203 is turned in the rearward direction of the automobile body, the mirror holder 207 which is pivotally supported on the bracket 203 is also moved with the bracket 203. Since the balls 242b, 252b are pivotally coupled to the mirror holder 207, the arms 233, 244 are turned in the rearward direction of the automobile body, i.e., in the direction T, about the shafts 222, 219. Upon rotation of the arm 233, inasmuch as the clutch 238 is engaged, the rod shaft 222 is angularly moved in the direction T in FIG. 40 under a force which is applied in a direction opposite to the normal direction, and the control lever 214 is turned in the direction indicated by the arrow Q through the arm 223, the coupling 226, and the swing rod 216.

When the arm 244 is turned in the rearward direction of the automobile body, the tubular shaft 219 is turned also in the direction T through the clutch 247, causing the control lever 213 to swing in the direction I.

The angular movement and swinging movement of the control lever 214 are limited to predetermined ranges. More specifically, the control lever 214 is angularly movable as much as the swing rod 216 is swingable in the range defined by the tapered portion 212d of the hole 212c shown in FIG. 36, and swingable as much as it is swingable in the oblong hole 209a. Therefore, as the arms 233, 244 are turned in the rearward direction of the automobile body, the control lever 214 reaches a limit position in its angular range, and is stopped. Upon continued angular movement of the arms 233, 244 in the direction T, the clutches 238, 247 are disengaged, preventing the forces from the arms 233, 244 from being transmitted to the control lever 214.

More specifically, as shown in FIG. 40, insofar as the control lever 214 is movable, the clutch 238 remains engaged, and the rotation of the arm 233 is transmitted through the clutch 238 to the rod shaft 222, which is turned in the direction T. When the control lever 214 reaches its limit position and is stopped, the rod shaft 222 is also stopped. Further angular movement of the arm 233 forces the springs 236 to turn in the direction T with respect to the large-diameter portion 222b of the rod shaft 222 which is kept at rest. The side portions 236b of the springs 236 are disengaged from the engaging surfaces 222c, i.e., the clutch 238 is disengaged. The side portions 236b of the springs 236 are positioned on the ridges 222e of the large-diameter portion 222b as indicated by the imaginary lines in FIG. 40, and the springs 236 move around the shaft 222, so that the forces from the arm 233 are prevented from being applied to the control lever 214. In this embodiment, even after the control lever 214 reaches its limit and is stopped, the arm 233 rotates and the clutch 238 is disengaged. However, the operating torque applied to the control lever 214 may be increased to a value greater than the load applied to engage and disengage the control lever 214, so that the clutch 238 may be disengaged without the control lever 214 being operated.

The clutch 247 operates in the same manner as the clutch 238. That is, the clutch 247 is disengaged when the springs 246 are disengaged from the engaging surfaces 219a of the tubular shaft 219, and the forces from the arm 244 are prevented from being applied to the control lever 214.

The mirror angle adjusting device according to the second embodiment offers the following advantages:

Since the side portions 236b of the springs 236 resiliently engage the two engaging surfaces 222c that lie at a substantially right angle to each other, the engaging surfaces 222c and the springs 236 are held in reliable engagement with each other against being loosened. The arcuate portions 236c on the ends of the side portions 236b are effective to apply forces to keep the side portions 236b engaging the engaging surfaces 222c, the side portions 236b and the engaging surfaces 222a engage each other more reliably. Furthermore, inasmuch as the two springs 236 are positioned one on each side of the rod shaft 222 in sandwiching relationship to the rod shaft 222 and are resiliently pressed against the rod shaft 222 from opposite sides thereof, the side portions 236b and the engaging surfaces 222c engage each other highly effectively.

In the second embodiment, the arcuate portions 236c are disposed as main resilient portions at the ends of the side portions 236b. Therefore, when the side portions 236b disengage from the engaging surfaces 222c and engage the ridges 222e as indicated by the imaginary lines in FIG. 40, the angle between the side portions 236b remains unchanged, i.e., the side portions 236b are not deformed. As a result, the springs 236 remain highly durable.

As the support member 235 is disposed in the arm 233, the axial dimensional accuracy may be increased even if the arm 233 is formed by pressing. The support member 235 which is made of synthetic resin is a low-friction member for giving the user a smooth feeling in adjusting the angles of the rearview mirror M.

The above advantages with respect to the springs 236 hold true for the springs 246.

The cylindrical larger rotational body 212 is rotatably received in the arcuate recess 208f, and the cylindrical smaller rotational body 215 coupled to the control lever 214 is rotatably fitted in the hole 212b of circular cross section. Since these rotational bodies 212, 215 are fitted in the arcuate and circular recesses 208f, 212b, respectively, no spherical surface engagement is employed therebetween. Therefore, spherical surfaces which are difficult to machine are not required to be produced in the manufacture of automotive rearview mirror assemblies, which can thus be manufactured easily and inexpensively.

As the rotational bodies 212, 215 are fitted in the arcuate and circular recesses 208f, 212b, respectively, the rotational bodies 212, 215 are rotatable about the respective axes of the arcuate and circular recesses 208f, 212b, and hence the control lever 214 is movable in the related directions, i.e., the directions Q, R in FIG. 24 and the directions I, J in FIG. 25. Because the angles of the mirror M are required to be adjusted only in horizontal and vertical directions, the control lever 214 is only required to be moved in corresponding two directions, and any movement of the control lever 214 in other directions would make the mirror angle adjustment difficult. In the second embodiment, as described above, the control lever 214 is movable only in the directions Q, R in FIG. 24 and the directions I, J in FIG. 25, but not in other directions. Thus, the mirror angle adjusting device according to the second embodiment makes it easy to adjust the angles of the rearview mirror M.

As described above, no spherical surface engagement is relied upon, but the rotational bodies 212, 215 are fitted in the arcuate and circular recesses 208f, 212b, respectively, it is possible to increase the areas of contact between the contacting surfaces of these members. Thus, these members are subject to slow wear and small wobbling movement even after they are used for a long period of time.

Figure 51:
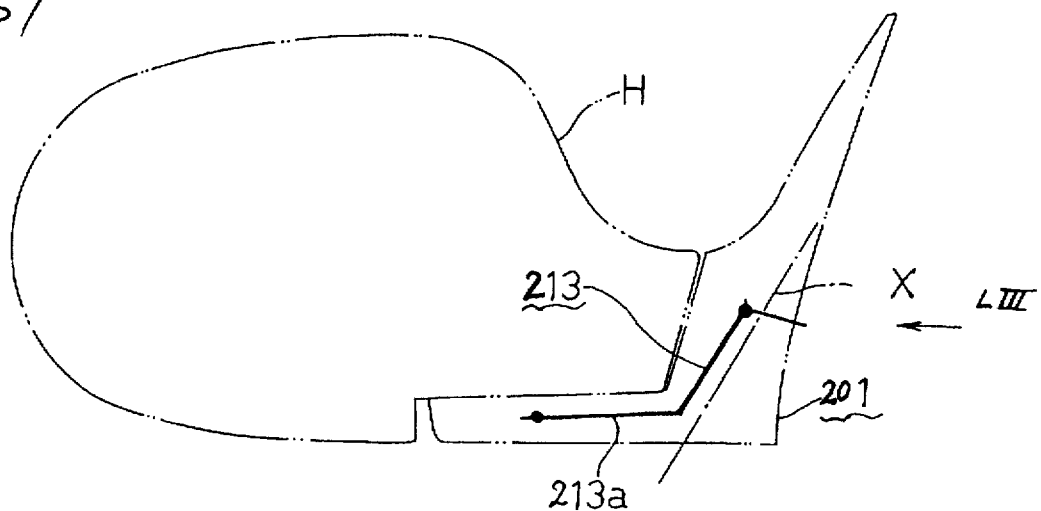
FIG. 51 is a schematic front elevational view of an automotive rearview mirror assembly, illustrating an action of the arm for the control lever of the mirror angle adjusting device.

In the second embodiment, as shown in FIG. 51, an axis X about which the arm 213 is rotatable, i.e., the axis X about which the rotational body 212 is rotatable, is not perpendicular to the ground, but is tilted with respect to the ground. When the arm 213 rotates about the axis X, therefore, the horizontal portion 213a of the arm 213 is vertically shifted.

Figure 52:
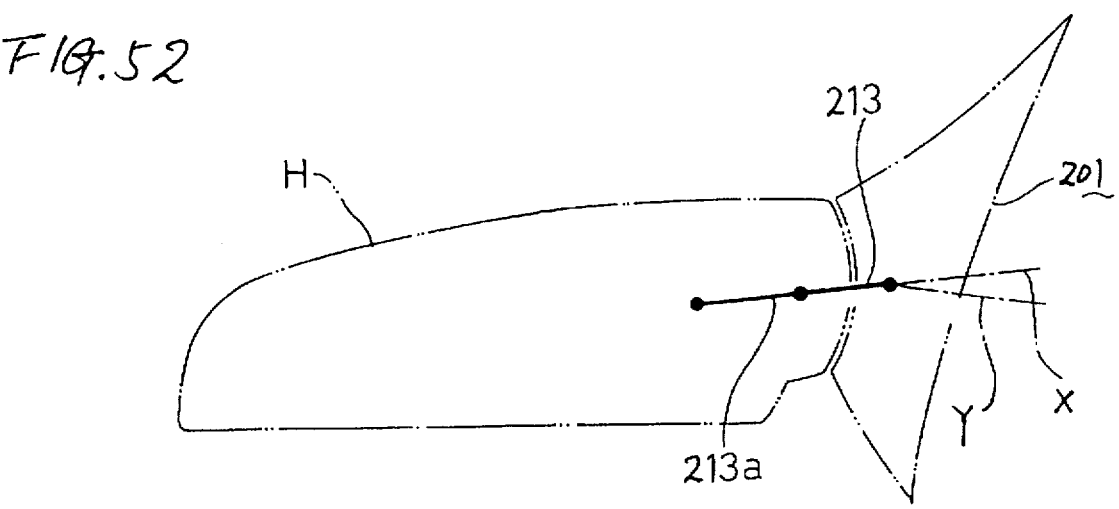
FIG. 52 is a schematic plan of the automotive rearview mirror assembly shown in FIG. 51.
Figure 53:
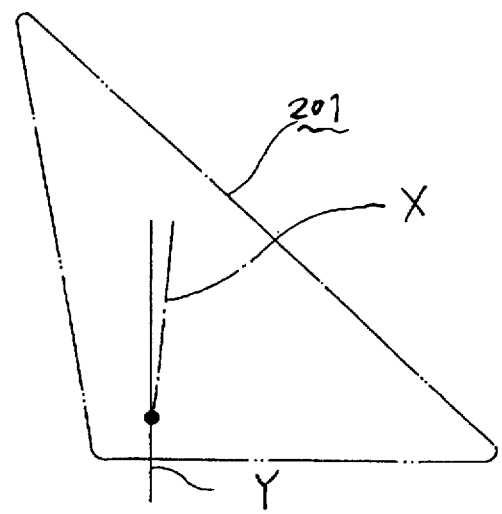
FIG. 53 is a view of the automotive rearview mirror assembly as viewed in the direction indicated by the arrow LIII in FIG. 51.
Figure 54:
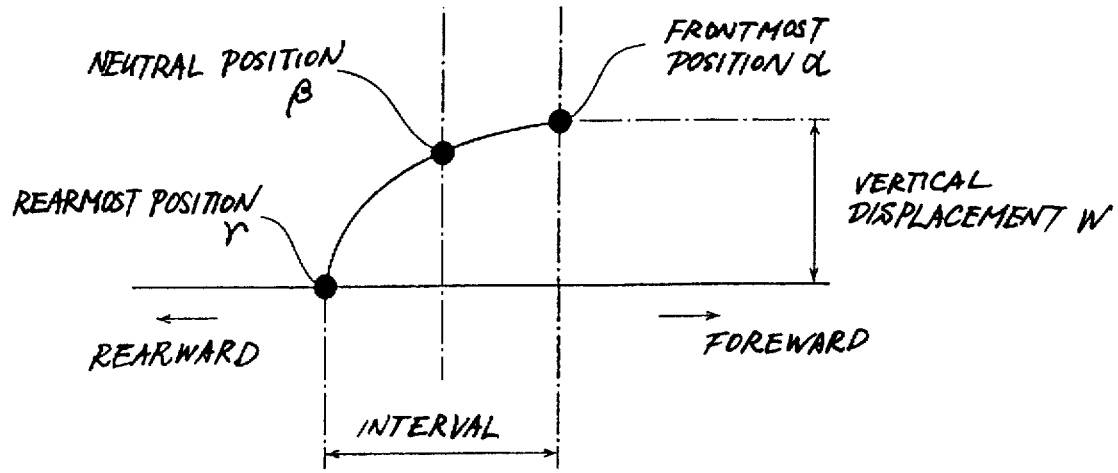
FIG. 54 is a diagram showing a vertical displacement of a conventional arm for a control lever.
Figure 55:
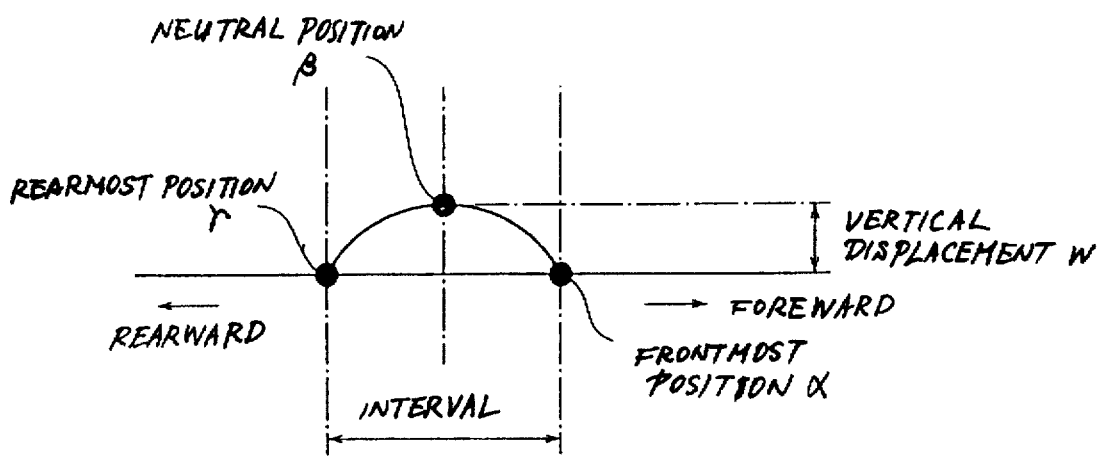
FIG. 55 is a diagram showing a vertical displacement of the arm for the control lever according to the present invention.

Since the arm 213 is inclined in the rearward direction of the automobile body as viewed in plan, the arm 213 is in the highest position when it is in the frontmost position α, as shown in FIG. 54, and in the lowest position when it is in the rearmost position γ, with the vertical displacement w therebetween being considerably large. It is necessary that a large space for accommodating the displacement of the horizontal portion 213a be created in the base member 201. According to the second embodiment, as shown in FIG. 52, the axis X is aligned with the longitudinal direction of the arm 213 in its neutral position. As a consequence, as shown in FIG. 53, the axis X is inclined forwardly with respect to a vertical line Y as viewed in side elevation. Therefore, as shown in FIG. 55, it is possible to maximize the vertical displacement w of the arm 213 in the neutral position β and minimize the vertical displacement w in the frontmost and rearmost positions α, γ, with the vertical displacement w being uniformly distributed on the opposite sides of the neutral position β. Accordingly, the vertical displacement w can be reduced as much as possible.

Although there have been described what are at present considered to be the preferred embodiments of the invention, it will be understood that the invention may be embodied in other specific forms without departing from the essential characteristics thereof. The present embodiments are therefore to be considered in all respects as illustrative, and not restrictive. The scope of the invention is indicated by the appended claims rather than by the foregoing description.

What is claimed is:

1. A mirror angle adjusting device for use with an automotive rearview mirror assembly, comprising:

a base member adapted to be fixed to an automobile body;

a mirror housing assembly coupled to said base member so as to be movable angularly about said base member, a mirror holder tiltably supported on said mirror housing assembly and holding a rearview mirror;

control lever means for remotely controlling angular adjustment of said rearview mirror; and coupling means for coupling said mirror holder and said control lever means;

said coupling means comprising a rotatable shaft mechanism having at least one shaft rotatable about an axis thereof in response to operation of said control lever means, an arm swingable about said shaft in response to rotation of said shaft for tilting said mirror holder, and a clutch means for selectively disconnecting said control lever means from said mirror holder, said clutch means comprising a cam on said shaft, and flat spring means between said arm and said shaft for resiliently engaging said cam, said shaft having at least one flat engaging surface on an outer circumference of said shaft to define said cam, said arm having a flat base and a hole through which said shaft is rotatably inserted, said flat spring means comprising at least one rod-shaped spring extending along said flat base in a longitudinal direction thereof and resiliently engaging said flat base with said engaging surface.

2. A mirror angle adjusting device according to claim 1, wherein said shaft has a pair of diametrically opposed flat engaging surfaces as said cam on an outer circumference thereof, said flat spring means comprising a pair of rod-shaped springs extending in a longitudinal direction on opposite sides of said shaft with each engaging a flat surface on opposite sides of said shaft in resilient engagement.

3. A mirror angle adjusting device according to claim 1, wherein said mirror housing assembly comprises:

a bracket coupled to a back of said mirror holder through a pivot member so that said mirror holder is tiltably supported on said bracket, said bracket being angularly movably held in engagement with an upstanding fixed shaft on said base member; and a mirror housing coupled to said bracket;

said bracket and said base member having respective surfaces abutting against each other and having convex and concave members, respectively, which are engageable with each other.

4. A mirror angle adjusting device according to claim 3, further comprising resilient means for resiliently allowing said bracket to move away from said base member to cause said convex and concave members to disengage from each other when said mirror housing is turned by an external force to change an angular position thereof with respect to said base member, and for biasing said convex and concave members to engage each other again after said mirror housing is released from said external force.

5. A mirror angle adjusting device according to claim 4, wherein said arm has a distal end pivotally coupled to the back of said mirror holder, said arm having an arcuate slot extending in a predetermined angular range about the axis of said shaft, said bracket having an upstanding tapered engaging pin extending substantially parallel to said shaft and slidably engaging in said arcuate slot, the arrangement being such that when said mirror housing is turned by the external force to change the angular position thereof with respect to said base member, said tapered engaging pin engages a peripheral edge of said arcuate slot to secure said bracket and said arm to each other upon movement of said bracket away from said base member to cause said convex and concave members to disengage from each other.

6. A mirror angle adjusting device according to claim 1, wherein said arm supports on the distal end thereof a slider having a ball-shaped pivot member and a spherical recess receiving said ball-shaped pivot member, said mirror holder having a space defined therein, and wherein said slider is slidably disposed in said space in order to absorb a displacement of said arm with respect to said mirror holder when said mirror holder is tilted in response to swinging movement of said arm.

7. A mirror angle adjusting device according to claim 1, wherein said control lever means comprises a cylindrical member rotatably disposed on said base member; and a control lever operatively coupled to said cylindrical member, said coupling means comprises first link means for operatively coupling said shaft to said cylindrical member to rotate said shaft in response to operation of said control lever to rotate said cylindrical member.

8. A mirror angle adjusting device according to claim 7, wherein said rotatable shaft mechanism comprises a tubular shaft as said at least one shaft, and a rod shaft disposed coaxially in said tubular shaft and rotatable independently of said tubular shaft, said control lever having a cylindrical end rotatably fitted in a cylindrical hole extending perpendicularly to an axis of said cylindrical member, said coupling means comprising second link means for operatively coupling said control lever to said rod shaft to rotate said rod shaft in response to rotation of said control lever.

9. A mirror angle adjusting device according to claim 7, wherein said rotatable shaft mechanism comprises a tubular shaft as said at least one shaft, and a rod shaft disposed coaxially in said tubular shaft and rotatable independently of said tubular shaft, said control lever being swingably supported on a support shaft extending perpendicularly to an axis of said cylindrical member, said coupling means comprising second link means for operatively coupling said control lever to said rod shaft to rotate said rod shaft in response to rotation of said control lever.

10. A mirror angle adjusting device according to claim 1, wherein said arm has a flat base having a hole through which said shaft is rotatably inserted, said shaft having a plurality of angularly spaced flat engaging surfaces as said cam on an outer circumference thereof, said flat spring means comprising at least one rod-shaped spring extending on said flat base in a longitudinal direction thereof, said rod-shaped spring comprising a bent central portion, two side portions extending from said central portion and held in resilient linear contact with at least two of said engaging surfaces, two main resilient portions extending from respective ends of said two side portions remote from said central portion, and engaging portions engaging said arm.

11. A mirror angle adjusting device according to claim 10, wherein said flat spring means comprises first and second rod-shaped springs superposed one on the other in an axial direction of said shaft.

12. A mirror angle adjusting device according to claim 11, wherein said engaging surfaces of said shaft include two pairs of diametrically opposite engaging surfaces such that said shaft has a substantially square cross section, said central portion of each of said first and second rod-shaped springs being bent into an L shape, said two side portions being first and second side portions with said central portion interposed between, said first and second side portions of said first rod-shaped spring being held in engagement with respective engaging surfaces of said shaft, said first and second side portions of said second rod-shaped spring being held in engagement with respective other engaging surfaces of said shaft.

13. A mirror angle adjusting device according to claim 12, wherein said first side portion of said first rod-shaped spring is placed over said first side portion of said second rod-shaped spring, and said second side portion of said first rod-shaped spring is placed beneath said second side portion of said second rod-shaped spring.

14. A mirror angle adjusting device according to claim 1, wherein said mirror housing assembly comprises a bracket coupled to a back of said mirror holder through a pivot member so that said mirror holder is tiltably supported on said bracket, said bracket being angularly movably held in engagement with an upstanding fixed shaft on said base member, and a mirror housing coupled to said bracket, said arm having a distal end positioned on said mirror holder such that said mirror holder is tiltable thereon, said mirror holder having a spherical recess displaced off said pivot member, said coupling means further comprising a pivot member having a first shaft portion slidably and rotatably fitted in a hole defined in said distal end of said arm, a second shaft portion bent at a right angle from said first shaft portion, and a ball mounted on a distal end of said second shaft portion and swingably fitted in said spherical recess.

15. A mirror angle adjusting device for use with an automotive rearview mirror assembly, comprising:

a base member adapted to be fixed to an automobile body;

a mirror housing assembly coupled to said base member so as to be movable angularly about said base member, a rearview mirror, a mirror holder tiltably supported on said mirror housing assembly and holding said rearview mirror;

control lever means for remotely controlling angular adjustment of said rearview mirror; and coupling means for coupling said mirror holder and said control lever means;

said coupling means comprising first and second arms, coaxially disposed first and second shafts independently rotatable relative to one another in response to operation of said control lever means and capable of vertically and horizontally adjusting the angle of said rearview mirror via said first and second arms, and clutch means capable of disconnecting said control lever means from said mirror holder, said clutch means including at least one flat spring means for resiliently connecting one of said shafts with its corresponding arm.

16. A mirror angle adjusting device according to claim 15, wherein each of said first and second shafts has at least one pair of diametrically opposed cam surfaces on an outer circumference thereof, said flat spring means including at least one pair of regions held in resilient contact with said at least one pair of diametrically opposed cam surfaces in opposite directions.

17. A mirror angle adjusting device for use with an automotive rearview mirror assembly, comprising:

a base member adapted to be fixed to an automobile body;

a mirror housing assembly coupled to said base member so as to be movable angularly about said base member, a rearview mirror;

a mirror holder tiltably supported on said mirror housing assembly and holding said rearview mirror;

control lever means for remotely controlling angular adjustment of said rearview mirror; and coupling means for coupling said mirror holder and said control lever means;

coaxially disposed first and second shafts coupled to said control lever means for independent rotation thereby, first and second arm each coupled to a different one of said first and second shafts to vertically and horizontally, respectively, control the angular movement of said mirror holder about a common horizontal and vertical axis, and clutch means including at least one flat spring means for resiliently connecting one of said shafts with its corresponding arm.

* * * * *